(12) United States Patent
Sengupta et al.

(10) Patent No.: US 8,935,654 B2
(45) Date of Patent: Jan. 13, 2015

(54) ANALYSIS SYSTEM FOR TEST ARTIFACT GENERATION

(75) Inventors: Shubhashis Sengupta, Bangalore (IN); Anurag Dwarakanath, Bangalore (IN); Roshni R. Ramnani, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 321 days.

(21) Appl. No.: 13/346,049

(22) Filed: Jan. 9, 2012

(65) Prior Publication Data

US 2012/0272206 A1    Oct. 25, 2012

(30) Foreign Application Priority Data

Apr. 21, 2011   (IN) ........................... 1370/CHE/2011
May 10, 2011   (IN) ........................... 1613/CHE/2011

(51) Int. Cl.
| | | |
|---|---|---|
| G06F 12/00 | (2006.01) | |
| G06F 17/30 | (2006.01) | |
| G06F 17/27 | (2006.01) | |
| G10L 21/00 | (2013.01) | |
| G06F 15/18 | (2006.01) | |
| G06F 17/00 | (2006.01) | |
| G06F 11/00 | (2006.01) | |
| G06F 9/44 | (2006.01) | |
| G06F 9/45 | (2006.01) | |
| G06F 11/36 | (2006.01) | |

(52) U.S. Cl.
CPC ........ G06F 17/2705 (2013.01); G06F 11/3684 (2013.01); G06F 11/3692 (2013.01)
USPC ................. 717/101; 700/91; 704/9; 704/275; 706/4; 706/58; 707/822; 714/32; 717/104; 717/124; 717/136; 717/143

(58) Field of Classification Search
CPC ............. G06F 8/10; G06F 8/20; G06F 8/427; G06F 11/28; G06F 11/3616; G06F 11/3624; G06F 17/27; G06F 17/271; G06F 17/274; G06F 17/277; G06F 17/30684; G06F 17/30663; G06F 17/30731
See application file for complete search history.

(56) References Cited

U.S. PATENT DOCUMENTS 5,369,575 A    11/1994   Lamberti et al.
5,774,833 A    6/1998    Newman
(Continued)

FOREIGN PATENT DOCUMENTS

EP            1 672 547 A1    6/2006

OTHER PUBLICATIONS

Baader, F. et al., "Description Logics," Reasoning Web. Semantic Technologies for Information Systems, 2009, 40 pages.
(Continued)

*Primary Examiner* — Don Wong
*Assistant Examiner* — Anibal Rivera
(74) *Attorney, Agent, or Firm* — Brinks Gilson & Lione

(57) ABSTRACT

A requirements testing system facilitates the review and analysis of requirement statements for software applications. The requirements testing system generates test artifacts from the requirement statements. The test artifacts characterize the requirements statements to provide valuable analysis information that aids understanding whether the requirement statements are testable, what the intentions of the requirement statements are, and other useful analysis information. Because the system generates the analysis information from the requirement statements, the system provides benefits in terms of early feedback along the software application development timeline.

18 Claims, 39 Drawing Sheets

(56) References Cited

U.S. PATENT DOCUMENTS

| | | | |
|---|---|---|---|
| 5,995,920 A | | 11/1999 | Carbonell et al. |
| 6,139,201 A | | 10/2000 | Carbonell et al. |
| 6,167,370 A | | 12/2000 | Tsourikov et al. |
| 6,343,297 B1 | | 1/2002 | D'Anjou et al. |
| 6,405,364 B1 | * | 6/2002 | Bowman-Amuah .......... 717/101 |
| 6,510,425 B1 | | 1/2003 | Okamoto et al. |
| 6,523,172 B1 | * | 2/2003 | Martinez-Guerra et al. . 717/143 |
| 6,643,645 B1 | * | 11/2003 | Fayyad et al. ........................ 1/1 |
| 6,681,383 B1 | | 1/2004 | Pastor et al. |
| 6,715,130 B1 | | 3/2004 | Eiche et al. |
| 6,886,115 B2 | | 4/2005 | Kondoh et al. |
| 7,058,567 B2 | * | 6/2006 | Ait-Mokhtar et al. ............ 704/9 |
| 7,111,076 B2 | | 9/2006 | Abjanic et al. |
| 7,146,422 B1 | | 12/2006 | Marlatt et al. |
| 7,337,102 B2 | | 2/2008 | Mosterman |
| 7,500,185 B2 | | 3/2009 | Hu |
| 7,536,711 B2 | | 5/2009 | Miyashita et al. |
| 7,593,891 B2 | | 9/2009 | Kornegay et al. |
| 7,647,349 B2 | | 1/2010 | Hubert et al. |
| 7,694,222 B2 | | 4/2010 | Steen et al. |
| 7,725,923 B2 | | 5/2010 | Miyashita et al. |
| 7,752,094 B2 | | 7/2010 | Davidson et al. |
| 7,769,570 B2 | | 8/2010 | Mosterman |
| 7,774,743 B1 | | 8/2010 | Sanchez et al. |
| 7,877,737 B2 | | 1/2011 | Austin et al. |
| 7,970,601 B2 | * | 6/2011 | Burmester et al. ............ 704/275 |
| 7,975,220 B2 | | 7/2011 | Hattori |
| 8,561,014 B2 | * | 10/2013 | Mengusoglu et al. ........ 717/136 |
| 2002/0065857 A1 | | 5/2002 | Michalewicz et al. |
| 2002/0147763 A1 | | 10/2002 | Lee et al. |
| 2002/0165717 A1 | | 11/2002 | Solmer et al. |
| 2002/0184397 A1 | | 12/2002 | Cooper |
| 2003/0004706 A1 | * | 1/2003 | Yale et al. ......................... 704/9 |
| 2003/0149692 A1 | | 8/2003 | Mitchell |
| 2003/0172135 A1 | | 9/2003 | Bobick et al. |
| 2003/0220853 A1 | | 11/2003 | Back et al. |
| 2004/0025110 A1 | | 2/2004 | Hu |
| 2004/0030540 A1 | | 2/2004 | Ovil et al. |
| 2004/0034651 A1 | | 2/2004 | Gupta et al. |
| 2004/0039734 A1 | | 2/2004 | Judd et al. |
| 2004/0083092 A1 | | 4/2004 | Valles |
| 2004/0123272 A1 | * | 6/2004 | Bailey et al. .................. 717/125 |
| 2004/0153992 A1 | | 8/2004 | Molina-Moreno et al. |
| 2004/0215443 A1 | | 10/2004 | Hatton |
| 2005/0005266 A1 | * | 1/2005 | Datig ............................. 717/136 |
| 2005/0108001 A1 | | 5/2005 | Aarskog |
| 2005/0216882 A1 | | 9/2005 | Sundararajan et al. |
| 2006/0041579 A1 | | 2/2006 | Miyashita et al. |
| 2006/0085451 A1 | | 4/2006 | Pal et al. |
| 2006/0085489 A1 | | 4/2006 | Tomic et al. |
| 2006/0190804 A1 | | 8/2006 | Yang |
| 2006/0265646 A1 | | 11/2006 | Girolami Rose |
| 2006/0282266 A1 | | 12/2006 | Lopez-Barquilla et al. |
| 2007/0143329 A1 | | 6/2007 | Vigen |
| 2007/0219933 A1 | * | 9/2007 | Datig ................................ 706/4 |
| 2007/0244859 A1 | | 10/2007 | Trippe et al. |
| 2007/0288107 A1 | * | 12/2007 | Fernandez-Ivern et al. .... 700/91 |
| 2007/0294230 A1 | | 12/2007 | Sinel et al. |
| 2008/0033897 A1 | | 2/2008 | Lloyd |
| 2008/0109475 A1 | * | 5/2008 | Burmester et al. ............ 707/102 |
| 2008/0263505 A1 | * | 10/2008 | StClair et al. ................. 717/101 |
| 2009/0125892 A1 | * | 5/2009 | Crewdson ..................... 717/136 |
| 2009/0138793 A1 | | 5/2009 | Verma et al. |
| 2009/0178021 A1 | * | 7/2009 | Alluri ........................... 717/104 |
| 2011/0099052 A1 | * | 4/2011 | Brun et al. ...................... 706/58 |
| 2011/0276944 A1 | * | 11/2011 | Bergman et al. .............. 717/124 |
| 2011/0307740 A1 | * | 12/2011 | Bruno ............................ 714/32 |
| 2012/0078611 A1 | * | 3/2012 | Soltani et al. ..................... 704/9 |
| 2012/0131073 A1 | * | 5/2012 | Olney ........................... 707/822 |

OTHER PUBLICATIONS

Brandozzi, M. et al., "Transforming Goal Oriented Requirement Specifications into Architecture Prescriptions," Proceedings STRAW '01, ICSE 2001, 8 pages.

Cunning, S. J. et al., "Test Scenario Generation from a Structured Requirements Specification," IEEE Conference and Workshop on Engineering of Computer-Based Systems, ecbs, 1999, 7 pages.

de Marneffe, M-C. et al., "Generating Typed Dependency Parses from Phrase Structure Parses," LRCE, 2006, 6 pages.

Fabbrini, F. et al., "The Linguistic Approach to the Natural Language Requirements Quality: Benefit of the use of an Automatic Tool," SEW '01 Proceedings of the 26th Annual NASA Goddard Software Engineering Workshop, 2001, 9 pages.

Fantechi, A. et al., "A Content Analysis Technique for Inconsistency Detection in Software Requirements Documents," WER, 2005, pp. 245-256.

Gnesi, S. et al., "An Automatic Tool for the Analysis of Natural Language Requirements," Comput. Syst. Sci. Eng., 2005, 13 pages.

Hall, J. G. et al., "Relating Software Requirements and Architectures using Problem Frames," Proceedings of the IEEE Joint International Conference on Requirements Engineering (RE '02), 2002, 8 pages.

Lin, D., "Dependency-Based Evaluation of MINIPAR," Text, Speech, and Language Technology 1, vol. 20, Treebanks, Part II, 2003, pp. 317-329.

Lin, D., "An Information-Theoretic Definition of Similarity," Proceedings of the 15th International Conference on Machine Learning 1, 1998, pp. 296-304.

Luisa, M. et al., "Market Research for Requirements Analysis Using Linguistic Tools," Requirements Engineering, vol. 9, No. 1, 2002, 26 pages.

Luo, L., "Software Testing Techniques: Technology Maturation and Research Strategy," Class Report for 17-939A, Institute for Software Research International, Carnegie Mellon University, 2009, 20 pages.

Mehta, N. R. et al., "Towards a Taxonomy of Software Connectors," In Proceedings of the 22nd International Conference on Software Engineering, 2000, pp. 178-187.

Offutt, J. et al., "Generating Tests from UML Specifications," U.S. National Science Foundation under grant CCR-98-04111 and Rockwell Collins, Inc., Robert Franc and Bernhard Rurape (Eds.), '99, LNCS 1723, 1999, pp. 416-429.

Paolucci, M. et al., "Semantic Matching of Web Services Capabilities," International Semantic Web Conference (ISWC), Sandinia, Italy, Jun. 9-12, 2002, pp. 333-347.

Pyysalo, S. et al., "Analysis of Link Grammar on Biomedical Dependency Corpus Targeted at Protein-Protein Interactions," JNLPBA '04 Proceedings of the International Joint Workshop on Natural Language Processing in Biomedicine and its Applications, 2004, pp. 15-21.

Rech, J. et al., "Intelligent Assistance in German Software Development: A Survey," IEEE Software, vol. 24, No. 4, 2007, pp. 72-79.

Zimmermann, O. et al., "Managing Architectural Decision Models with Dependency Relations, Integrity Constraints, and Production Rules," Journal of Systems and Software, vol. 82, No. 8, Aug. 2009, 36 pages.

Alani, H. et al., "Automatic Ontology-Based Knowledge Extraction from Web Documents," IEEE Intelligent Systems, 2003, pp. 14-21.

Anandha Mala, G.S. et al., "Automatic Construction of Object-Oriented Design Models [UML Diagrams] from Natural Language Requirements Specification," PRICAI, 2006, pp. 1155-1159.

ANTLR, URL: printed from the internet at <http://www.antir.org>, on May 18, 2010, 2 pages.

"Apache OpenNLP," The Apache Software Foundation, 2010, printed from the internet at <http://incubator.apache.org.opennlp/index.html> on Aug. 22, 2011, 2 pages.

Appfuse, 2008, printed from the internet at <http://appfuse.org/display/APF/Home> on Aug. 16, 2011, 2 pages.

Baader, F. et al., Chapter 3, Description Logics, Elsevier, 2007, 47 pages.

Baral, C. et al., "Using AnsProlog with Link Grammar and WordNet for QA with deep reasoning," 9th International Conference on Information Technology, IEEE Computer Society, 2006, 4 pages.

Basili, V. R. et al., "Comparing the Effectiveness of Software Testing Strategies," IEEE Transactions on Software Engineering, vol. SE-13, No. 12, 1987, pp. 1278-1296.

(56) References Cited

OTHER PUBLICATIONS

Basler, M. et al., "Introducing the Java Pet Store 2.0 Application," 2007, printed from the internet at <http://java.sun.com/jsp.utils/PrintPage.jsp?url=http%3A%2F%2Fjava.sun.com%2Fdevelo . . . > on Aug. 17, 2011, 10 pages.

Biswal, B. N. et al., "A Novel Approach for Scenario-Based Test Case Generation," International Conference on Technology, IEEE Computer Society, 2008, pp. 244-247.

Boehm, B. et al., "Identifying Quality-Requirement Conflicts," IEEE Software, vol. 13, No. 2, IEEE Computer Society Press, Los Alamitos, 1996, pp. 25-35.

Boehm, B. W., "Understanding and Controlling Software Costs," IEEE Transactions on Software Engineering, vol. 14, No. 10, 1988, pp. 1462-1477.

Borland Software Corporation, "Mitigating Risk with Effective Requirements Engineering," Apr. 2005, 14 pages.

Ravenflow website, 2005-2006, http://www.ravenflow.com, last accessed on Jan. 30, 2008, 71 pages.

Crain, A., "The Simple Artifacts of Analysis and Design," IBM Software Group, 2004, printed from the internet at <http://www.ibm.com/developerworks/rational/library/4871.html> on Aug. 18, 2011, 7 pages.

Curtis, Dr. B., Best Practices for Requirements Development and Management, Borland Software Corporation, 2005, 36 pages.

Dahab, M. Y. et al., "TextOntoEx: Automatic ontology construction from natural English text," Expert Systems with Applications, vol. 34, 2008, pp. 1474-1480.

Daneva, M., "ERP Requirements Engineering Practice: Lessons Learned," IEEE Software, 2004. pp. 26-33.

Daneva, M., "Establishing Reuse Measurement Practices in SAP Requirements Engineering," IEEE, 2000, 10 pages.

Dashofy, E. M. et al., "A Comprehensive Approach for the Development of Modular Software Architecture Description Languages," ACM Transactions on Software Engineering and Methodology, vol. 14, No. 2, 2005, pp. 199-245.

de Marneffe, M-C. et al., "Stanford typed dependencies manual," Sep. 2008 (Revised for Stanford Parser v. 1.6.2, 2010), 20 pages.

Deeptimahanti, D. K. et al., "An Automated Tool for Generating UML Models from Natural Language Requirements," IEEE/ACM International Conference on Automated Software Engineering, IEEE Computer Society, 2009, pp. 680-682.

Deeptimahanti, D. K. et al., "Semi-automatic Generation of UML Models from Natural Language Requirements," India Software Engineering Conference, 2011, pp. 165-174.

Dickinson, I., "Jena Ontology API," 2009, printed from the internet at <http://jena.sourceforge.net/ontology/> on Feb. 21, 2012, 29 pages.

Duan, M., "Ravenflow Seeks to Eliminate Software Ambiguity, Errors," Silicon Valley / San Joes Business Journal, Nov. 17, 2006, 2 pages.

Egyed, A., "Scalable Consistency Checking between Diagrams—The ViewIntegra Approach," Proceedings of the 16th IEEE International Conference on Automated Software Engineering, USA: San Diego, 2001, 4 pages.

Gervasi, V. et al., "Reasoning About Inconsistencies in Natural Lanugauge Requirements," ACM Transactions on Software Engineering and Methodology, vol. 14, No. 3, 2005, pp. 277-330.

Glass, R. L., *Facts and Fallacies of Software Engineering*, Addison Wesley, copyright 2003, 150 pages.

Grunbacher, P. et al., "Reconciling Software Requirements and Architectures: The CBSP Approach," Proceedings of the 5th IEEE International Symposium on Requirements Engineering, Toronto, Canada, 2001, 10 pages.

Hayes, J. H. et al., "Advancing Candidate Link Generation for Requirements Tracing: The Study of Methods," IEEE Transactions on Software Engineering, vol. 32, No. 1, 2006, pp. 4-19.

Hooks, I. F., "Managing Requirements," Crosstalk, The Journal of Defense Software Engineering, vol. 17, No. 8, Aug. 2004, 8 pages.

IBM DeveloperWorks: Rational Software Architect, printed from the internet at <http://www.ibm.com/developerworks/rational/products/rsa/> on Aug. 18, 2011, 2 pages.

IEEE Recommended Practice for Architectural Description of Software-Intensive Systems, The Institute of Electrical and Electronics Engineering, Inc., 2000, 29 pages.

IEEE Recommended Practice for Software Requirement Specifications, IEEE/ANSI Standard 830-1998, Institute of Electrical and Electronics Engineers, 1998, 39 pages.

"IEEE Standard for Software and System Test Documentation," IEEE Standard 829-2008, IEEE Computer Society, 2008, 132 pages.

IEEE Standard Glossary of Software Engineering Terminology, IEEE Std. 610.12-1990, Standards Coordinating Committee of the Computer Society of the IEEE, New York, Sep. 1990, 84 pages.

Ilieva, M. G. et al., "Automatic Transition of Natural Language Software Requirements Specification into Formal Presentation," Natural Language and Processing Information Systems, Lecture Notes in Computer Science, vol. 3513, copyright Springer-Verlag, 2005, pp. 392-397.

Information Technology—Open Distributed Processing—Reference model: Architecture, International Standard, ISO/IEC 10746-3, 1st Ed. 1996, 68 pages.

Information technology—Open Distributed Processing—Reference model: Foundations ISO/IEC 10746-2, 1st Ed., 1996, 28 pages.

Jain, P. et al., "Automated Review of Natural Language Requirements Documents: Generating Useful Warnings with User-extensible Glossaries Driving a Simple State Machine," ISEC '09, ACM, 2009, pp. 37-45.

Jena—A Semantic Web Framework for Java, printed from the internet at <http://jena.sourceforge.net>, last retrieved on Oct. 10, 2008, 1 page.

Jirapanthong, W. et al., "XTraQue: traceability for product line systems," Software and Systems Modeling, vol. 8, 2009, pp. 117-144.

Keshav, R. et al., "Towards a Taxonomy of Architecture Integration Strategies," the 3rd International Software Architecture Workshop, 1998, 4 pages.

Kof, L., et al., "Faster from Requirements Documents to System Models: Interactive Semi-Automatic Translation with a tool that is learning on the fly," Requirements Engineering Efficiency Workshop, 17th International Working Conference on Requirements Engineering: Foundation for Software Quality, 2011, 41 pages.

Kosindrdecha, N. et al., "A Test Generation Method Based on State Diagram," Journal of Theoretical and Applied Information Technology, 2010, pp. 28-44.

Kruchten, P., "An Ontology of Architectural Design Decisions in Software-Intensive Systems," 2004, 8 pages.

Kruchten, P., "Architectural Blueprints—The "4+1" View Model of Software Architecture," IEEE Software, vol. 12, No. 6, 1995, 15 pages.

Lami, G. et al., "An Automatic Tool for the Analysis of Natural Langauge Requirements," published as Technical Report 2004-TR-40, Consiglio Nazionale delle Ricerche, Instituto di Scienza e Tecnologie dell'Informazione 'A.Faedo', 2004, 21 pages.

Lami, G., "QuARS: A Tool for Analyzing Requirements," Software Engineering Measurement and Analysis Initiative, Technical Report, 2005, 46 pages.

Lau, K-K. et al., "A Taxonomy of Software Component Models," Proceedings of the 2005 31st EUROMICRO Conference on Software Engineering and Advanced Applications, IEEE, 2005, 8 pages.

Li, L. et al., "A Software Framework for Matchmaking Based on Semantic Web Technology," in WWW, 2003, pp. 331-339.

Li, Y. et al., "Sentence Similarity Based on Semantic Nets and Corpus Statistics," IEEE Transactions on Knowledge and Data Engineering, vol. 18, No. 8, 2006, pp. 1138-1150.

Litvak, B. et al., "Behavioral Consistency Validation of UML Diagrams," Proceedings of the First International Conference on Software Engineering and Formal Methods, IEEE Computer Society, 2003, 8 pages.

Liu, D. et al., "Natural Language Requirements Analysis and Class Model Generation Using UCDA," IEA/AIE, Springer-Verlag, 2004, pp. 295-304.

Maiden, N. A. et al., "Acquiring COTS Software Selection Requirements," IEEE Software, 1998, pp. 46-56.

Marcus, M. P. et al., "Building a Large Annotated Corpus of English: the Penn Treebank," Computational Linguistics, 1993, 22 pages.

(56) References Cited

OTHER PUBLICATIONS

Medvidovic, N. et al., "A Classification and Comparison Framework for Software Architecture Description Languages," IEEE Transactions on Software Engineering, vol. 26, No. 1, 2000, pp. 70-93.

Mihalcea, R. et al., "Corpus-based and Knowledge-based Measures of Text Semantic Similarity," in American Associate for Artificial Intelligence, 2006, 6 pages.

Miller, G. A., "Wordnet: A Lexical Database for English," Communications of the ACM, vol. 38, No. 11, 1995, pp. 39-41.

"Modeling," Software Development Times, Jun. 1, 2007, 2 pages.

Morisio, M. et al., "Definition and Classification of COTS: A Proposal," ICCBSS, Orlando, FL, 2002, 10 pages.

Nanduri, S. et al., "Requirements Validation via Automated Natural Language Parsing," Proceedings of the 28th Annual Hawaii International Conference on System Sciences, IEEE, 1995, pp. 362-368.

Nebut, C. et al., "Automatic Test Generation: A Use Case Driven Approach," IEEE Transactions on Software Engineering, vol. 32, No. 3, 2006, pp. 140-155.

Neill, C. J. et al., "Requirements Engineering: The State of the Practice," IEEE Software, IEEE Computer Society, vol. 20, No. 6, 2003, pp. 40-45.

OWL Web Ontology Language Overview, W3C, available from http://www.w3.org/TR/owl-features/, last retrieved on Oct. 10, 2008, 13 pages.

Paolucci, M. et al., "Semantic Matching of Web Services Capabilities," 15 pages.

Phyu, A. L. L. et al., "Domain Adaptive Information Extraction Using Link Grammar and WordNet," Fifth International Conference on Creating, Connecting, and Collaborating through Computing, IEEE Computer Society, 2007, 7 pages.

Porter, M. F., "An Algorithm for Suffix Stripping," Program, vol. 14, No. 3, 1980, pp. 130-137.

"Raven Professional Includes Five New Modules," Computer Magazine, Nov. 2006, p. 85.

Raven Software, URL: available at www.ravensoft.com last retrieved Aug. 26, 2010, 1 page.

Robinson, W. N. et al., "Requirements Interaction Management," ACM Computing Surveys, vol. 35, No. 2, Jun. 2003, pp. 1-59.

Robinson, W. N. et al., "Requirements Interaction Management," Georgia State University, Department of Computer Information Systems Working Paper 99-7, Aug. 30, 1999, 68 pages.

RosettaNet website, 2012, printed from the internet at <http://www.rosettanet.org/> on Feb. 21, 2012, 2 pages.

Rubinstein, D., "Quoth the Ravenflow: Drag-and_Drop Nevermor: Requirments Suite Generates UML Diagrams from Plain Text," Software Development Times, Mar. 15, 2006, Issue No. 146, 1 page.

Ryan, K., "The Role of Natural Language in Requirements Engineering," IEEE, 1992, pp. 240-242.

Schindler, E., "Learning to Speak 'User'," Digital Producer Magazine, Mar. 2006, 2 pages.

Schmerl, B. et al., "AcmeStudio: Supporting Style-Centered Architecture Development," In Proc. 2004 International Conference on Software Engineering, Edinburgh, Scotland, 2004, 2 pages.

Schmidt, D., "Model-Driven Engineering," IEEE Computer Society, 2006, pp. 25-31.

Selic, B. "The Pragmatics of Model-Driven Development," IEEE Software, 2003, pp. 19-25.

Shahin, M. et al., "Improving Understandability of Architecture Design through Visualization of Architectural Design Decision," SHARK '10, ACM, 2010, 8 pages.

Sharma, V. S. et al., "Extracting High-Level Functional Design from Software Requirements," 16th Asia-Pacific Software Engineering Conference, IEEE Computer Society, 2009, pp. 35-42.

Sinha, A. et al., "Text2Test: Automated Inspection of Natural Language Use Cases," 2010 Third International Conference on Software Testing, Verification and Validation, IEEE Computer Society, 2010, pp. 155-162.

Skyway software, printed from the internet at <http://www.skywaysoftware.com/> on Aug. 22, 2011, 3 pages.

Sleator, D. D. et al., "Parsing English with a Link Grammar," CMU Technical Report, 1991, 93 pages.

Sleator, D. D. et al., "Parsing English with a Link Grammar," In Third International Workshop on Parsing Technologies, 1993, 14 pages.

Sleator, D., "Link Grammar License," 2005, printed from the internet at <http://www.link.cs.cmu.edu/link/license.html> on Feb. 21, 2012, 1 page.

Sleator, D., "Summary of Link Types," 1998, 7 pages.

Sneed, H. M., "Testing Against Natural Language Requirements," Seventh International Conference on Quality Software, IEEE Computer Society, 2007, 8 pages.

Soffer, P. et al., "Modelling Off-the-Shelf Information Systems Requirements: An Ontological Approach," Requirements Engineering, vol. 6, 2001, pp. 183-199.

Sutton, S. M. et al., "Text2Test: Automated Inspection of Natural Language Use Cases," IBM Search Report, Computer Science, 2009, 11 pages.

"The Declaration of Independence: Six Principles to Benefit You and Your Agile Organization," Better Software, www.StickMinds.com, Jun. 2006, pp. 24 and 36.

"The Phrase Parser," printed from the internet at <http://www.abisource.com/projects/link-grammar/dict/ph-explanation.html> on Feb. 21, 2012, 8 pages.

The Protege Ontology Editor and Knowledge Acquisition System, printed from the internet at <http://protege.stanford.edu/> on Aug. 16, 2011, 2 pages.

"The Stanford Parser: A statistical parser," The Stanford Natural Language Processing Group, printed from the internet at <http://nlp.stanford.edu/software/lex-parser.shtml> on Feb. 21, 2012, 6 pages.

Tolvanen, J-P. et al., "Defining Domain-Specific Modeling Languages to Automate Product Derivation: Collected Experiences," SPLC 2005, pp. 198-209.

van Lamsweerde, A. et al., "Managing Conflicts in Goal-Driven Requirements Engineering," IEEE Transactions on Software Engineering, Special Issue on Managing Inconsistency in Software Development, Nov. 1998, pp. 1-21.

Verma, K. et al., "Requirements Analysis Tool: A Tool for Automatically Analyzing Software Requirements Documents," ISWC 2008, Springer-Verlag, 2008, pp. 751-763.

"WebSphere Industry Content Packs accelerate Insurance, Banking, Telecom, Healthcare & Industrial PLM WebSphere BPM solutions," IBM Software, printed from the Internet at <http://www-142.ibm.com/software/products/gb/en/inducontpack/> on Feb. 21, 2012, 5 pages.

Wiegers, K. E., Software Requirements, Chapters 1-13, Microsoft Press, Redmond, 2003, 262 pages.

Wiegers, K. E., Software Requirements, Chapters 14—Appendix D, Microsoft Press, Redmond, 2003, 278 pages.

Wilson, W. M. et al., "Automatic Quality Analysis of Natural Language Requirement Specification," NASA, The Goddard Space Flight Center's Software Assurance Technology Center, http://satc.gsfc.nasa.gov/support/PNSQC-_OCT96/phq.html, dated Oct. 1996, pp. 1-19.

Yacc, URL: available at http://dinosaur.compilertools.net/yaac, last retrieved Apr. 29, 2010, 24 pages.

Yoo, J. et al., "A Formal Software Requirements Specification Method for Digital Nuclear Plant Protection Systems," The Journal of Systems and Software, vol. 74, 2005, pp. 73-83.

Young, R.R. 2000 Effective Requirements Practices, Addison-Wesley Longman Publishing Co, Inc. 2001, 387 pages.

Zachos, K. et al., "Inventing Requirements from Software: An Empirical Investigation with Web Services," in 16th IEEE International Requirements Engineering Conference, IEEE Computer Society, 2008, pp. 145-154.

Zamin, N., "Information Extraction using Link Grammar," 2009 World Congress on Computer Science and Information Engineering, IEEE Computer Society, 2008, pp. 149-153.

Boddu, R. et al., "RETNA: From Requirements to Testing in a Natural Way," Proceedings of the 12th IEEE International Requirements Engineering Conference, 2004, 10 pages.

(56) References Cited

OTHER PUBLICATIONS

Combined Search and Examination Report dated Apr. 26, 2012 for United Kingdom patent application No. GB1200413.1, 8 pages.
Examiner's first report dated Mar. 28, 2012 for Australian patent application No. 2012200171, 2 pages.
Second Examination Report dated Jul. 4, 2012 for corresponding Australian Application No. 2012200171, 3 pages.
Anderson, T., et al., "On Formal Support for Industrial-Scale Requirements Analysis", Department of Computing Science, University of Newcastle upon Tyne, UK, pp. 426-451, 1993.

* cited by examiner 5.1  S-I-O

The page should display the logo

Intent: Verify <agent> :: the page

Is able to <action> :: display

<object> :: the logo 5.1.2  Noun Modifiers

The system should generate the report of excellence

Intent: Verify <agent> :: the system

Is able to <action> :: generate

<object> :: the report

Verify <object> :: the report

Is <PP> :: of excellence 5.1.1  SJn,r

The system should print neither the report nor the letter

Intent: Verify <agent> :: the system

Is able to <action> :: print

<object> :: neither the report nor the letter

Figure 12

5.1.4 Noun Modifiers – infinitive to, object

The system should generate a password to authenticate the user

Intent1: Verify <agent> :: the system

Is able to <action> :: generate

<object> :: a password

Intent 2: Verify <object> :: the password

Is able to <action> :: authenticate

<object> :: the user

5.1.3 Noun Modifiers - Pronoun

The password should contain numbers whose total is 8

Intent1: Verify <agent> :: the password

Is able to <action> :: contain

<object> :: numbers

Intent 2: Verify <object's> :: numbers's

<SBAR> :: total is 8

Figure 13

5.1.5 Noun Modifiers – infinitive to

The user should enter the CLOSE command to exit

Intent1: Verify <agent> :: the user

Is able to <action> :: enter

<object> :: the CLOSE command

Intent 2: Verify <object> :: the CLOSE command

Is able to <action> :: exit

5.1.6 Noun Modifiers – "which"

The system should display passwords that are unencrypted

Intent1: Verify <agent> :: the system

Is/are able to <action> :: display

<object> :: passwords

Intent2: Verify <clause2> :: the passwords are unencrypted

Figure 14

5.1.9  Verb Modifiers – conjunctions

The system should print the report once

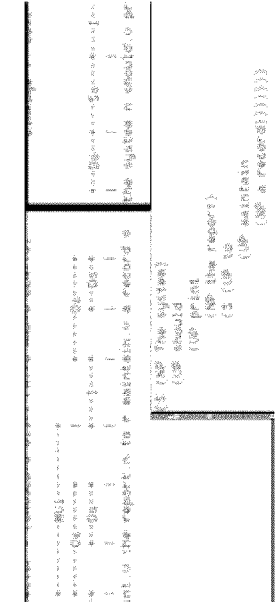

Intent: Verify <agent>:: the system

Is/are <N> able to <action>:: print

<object>:: the report

Intent2: Verify the <action>:: print

Of <object>:: the report

Happens <ADVP> :: once 5.1.10  Verb Modifiers – "in order to"

The system should print the report to maintain a record

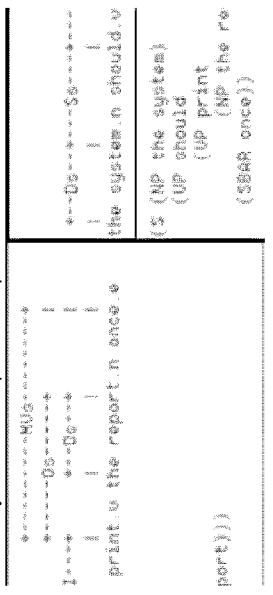

Intent: Verify <agent>:: the system

Is/are <N> able to <action>:: print

<object>:: the report

Intent2: Verify the <action> :: print

Of <Object> :: the report

Is/are able to <action2> :: maintain

<object2> :: a record

Figure 16

5.1.11 Verb Modified by forms of 'be' the system should put the tasks into the list

```
                    +-------Pp------+
          +---I---+  +--Dmcn-+     +-Op-+
+--Ds--+  +--Ss--+  |       |     |    |
the system should put   the tasks into the list.
(S (NP the system)
   (VP should
       (VP put (NP the tasks)
               (PP into
                   (NP the list)))))
```

Intent: Verify <agent>:: the system
Is/are <N> able to <action>:: put
<object>:: the task
<PP>:: into <NP>:: the list

5.2  S-If-O

The table should have 3 columns

```
                +-----Op-----+
      +---If--+ +--Dmcn-+   |
+-Ss-+ |      |  |       |   |
The table should v have v 3.# columns.n the table.n
(S (NP The table)
   (VP should
       (VP have
           (NP (NP 3 columns)))))
```

Intent: Verify <agent>:: the table
{has} <object>:: 3 columns

5.2.1  Infinitive 'to' - Object the system should take the administrator control to order a pizza

```
(complex parse tree)
```

Intent: Verify <agent>:: the system
{has} <object>:: administrator control
To <action2>:: order <object2>:: a pizza

Figure 17

5.2.2 Infinitive 'to' the system should take the administrator control to exit

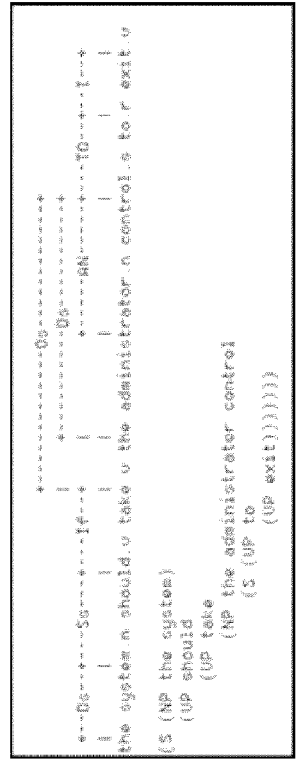

Intent: Verify <agent>:: the system

{has} <object>:: administrator control

To <action2>:: exit 5.2.3 Verb modifiers – adjectival;Prepositions;conjunctions the administrator should have access to the reports

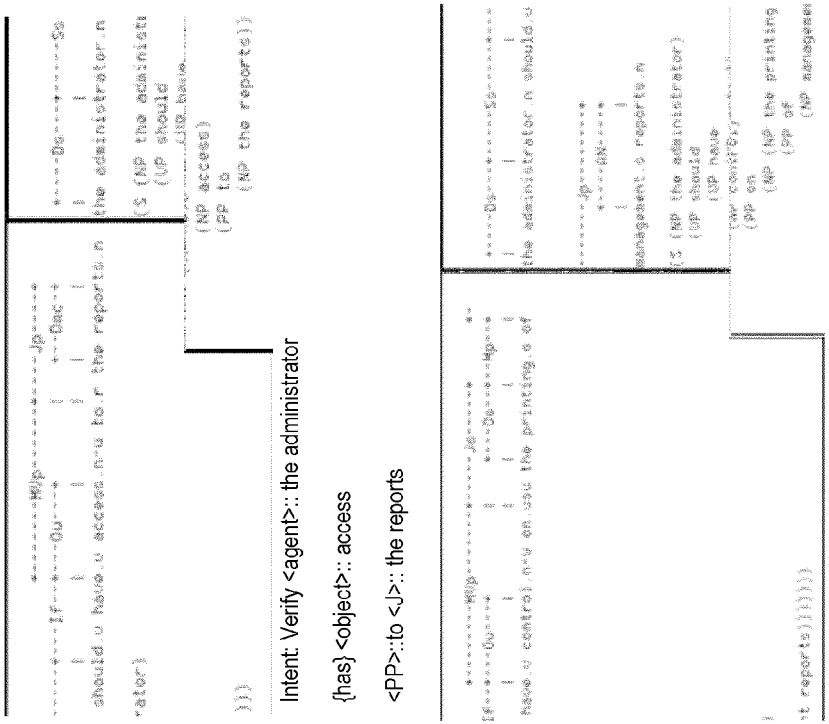

Intent: Verify <agent>:: the administrator

{has} <object>:: access

<PP>::to <J>:: the reports 5.2.4 Verb Modifiers – Connecting to noun modifiers
the administrator should have control on the printing of management reports Intent: Verify <agent>:: the administrator {has} <object>:: control <PP>:: on <J>the printing <PP>::of <J>management reports

Figure 18

5.3 Subject-Passive Action (S-Ix)
5.3.1 Modal Verb Modifiers –Adjectival

The system should be robust

```
+--Os--+--+--Ss--+--Ix--*--Pa--+
|      |  |      |     |       |
the system.n should.v be.v robust.a
```

(S (NP The system)
       (VP should
         (VP be
            (ADJP robust))))

Intent: Verify <agent>:: the system

Is/are <N> <ADJP>:: robust 5.3.2 Modal Verb Modifiers – Participle; gerund

The password should be encrypted

```
+--Ix--*--Pv--+
|      |      |
uld.v be.v encrypted.v-d the password.n sho
```

(S (NP The password)
       (VP should
         (VP be
            (VP enc
              rypted))))

Intent: Verify <agent>:: the password

Is/are <N> <ADJP>:: encrypted 5.3.3 Modal Verb Modifiers connecting to Verb Modifiers – Prepositions The system should be available for contact

```
+--Pa--*--MVp--*--Ju--+
|      |       |      |
v be.v available.a for.p contact.n-u
```

(S (NP The system)
       (VP should
         (VP be
            (ADJP avail
              able
              (PP for
                (NP contact))))))

Intent: Verify <agent>:: the system

Is/are <N> <ADJP>:: available

<PP>:: for contact <J>

5.3.4 Modal Verb Modifiers connecting to Verb Modifiers – "in order to"

A report should be available to their queries in

```
+--Pa--*--MVp--*--TO--*--I--+
|      |       |      |     |
```

(NP the report)
       (VP should
         (VP be
            (ADJP available)
              (VP to
                (VP respond
                  (PP to
                    (NP qu
))))

Intent: Verify <agent> :: the report

Is/are <N> <ADJP>:: available

Intent2: Verify <agent> :: the report

Is / are <N> able to <action2>::respond

<MVp> <NP>

Figure 19

5.3.5 Modal Verb Adjectival Modifier – Connecting to infinitival 'to' – object
The system should be able to print the reports

```
+-*-*Ss-*-*-+
|           |
+-*-Np-*-+  +-*-*To-*-*-+   +-*-Opt-+
|        |  |           |   |       |
u be.v able.a to.r print.v the reports.n
```

```
(S (NP the system)
   (VP should
       (VP be
           (ADJP able
                 (S (VP to
                        (VP print
                            (NP the reports)))))))) 
```

Intent: Verify <agent>:: the system

Is/are <N> <ADJP>:: able to
    <action>:: print
        <object> :: the report 5.4  S-Ix-OF The report should be of decent quality

```
+-*-*Ss*-*-+   +-*-*Pa-*-*-+
|          |   |           |
+-*-Ds-+   |   +-*-Opt-+   |
|      |   |   |       |   |
Np*    |   |   |       |   |
the report.n should.v be.v of decent.a quality.n
```

```
(S (NP the report)
   (VP should
       (VP be
           (PP of decent quality))))
```

Intent: Verify <agent>:: the report

5.5    Subj-Participle – infinitval 'to' – Object

The users are required to produce management reports when needed

```
 * management * is required to * produce
 *             *                *
 *-Ds----*--Ss-*                *--Os--*
 *       *     *                *      *
the users.n are.v required.v to.r produce
                                 (NP management reports)
                                 (UP (using when)
                                     (NP needed)))
```

Verify <agent>:: the users

Is/are <N> able to <action>:: produce

<object>:: the management reports

Verify the <action>:: produce

Of <object>:: the management reports

Happens <MVs>:: when <Mv>:: needed 5.6    Cause & effect – Testable & non-testable clauses C (among other things) connects 'when' & 'after' to the subject of the clause. By removing the C link, the sentence is broken into two clauses. The system 102 tests whether any of the earlier identified testable links occur in the clauses – if so, substitute with the corresponding intent, else check for the following basic link: <clause->: S-O, <clause+>: S-I after the user clicks the button, the window should close

```
           *-----------Xc----------*
           *                       *---CO*s--*
 *--Cs-----*--Ss-*                 *         *
 *         *     *                 *         *--Ds--*--Ss*--I-*
 *         *     *--Ds--*--Ss*--I--*         *      *    *    *
after the user.n clicks.v the button.n , the window.n should.v close.v
(S (SBAR after
       (S (NP the user)
          (VP clicks
              (NP the button))))
   , (NP the window)
   (VP should
       (VP close
           ))
```

{Intent-}: Verify <agent->:: the user

<action->:: clicks

<object->:: the button

{Intent+}: Verify <agent+>:: the window

Is/are <N> able to <action+>::close

<object+>

The CC link connects from the Subject of the first clause to the conjunction "and".

The system 102 may break the sentences into two clauses. <clause-> is the set of words that can be reached from CC-. <clause+> that can be reached through <CC+>. The system 102 may run the testability of individual clauses and find the relevant intents.

The Screen should display the user's home page and the user should be allowed to alter it

```
              +------------------CC-----------------+
              |        +---------Os--------+        |
              +--Dg-+--Ss-+--I--+          +--Op-+  +--Os-+
              |     |     |     |          |     |  |     |--Ndc---+
              |     |     |     |          |     +--AN-+  |        |
              |     |     |     |          |     |     |  |        |
the screen should    display    the user's  home page  and ij the user n Ss-+--Ix-+--Pv-+--TO-+--I--+--Ox+
   |     |     |     |     |    |
should u be u allowed u-d to r alter u it (S (NP The Screen)
  (VP should
    (VP display
      (NP (NP the user's)
          home page))
  and
  (S (NP the user)
    (VP should
      (VP be
        (VP allowed
          (S (VP to
            (VP alter
              (NP it))))))))
```

<Intent-> Verify <agent->:: the screen

Is <N> able to <action->:: display

<object->:: the user's home page

<Intent+> Verify <agent+>:: the user

Is <PV+>:: allowed

To <action+> alter

<object+>{it}

Figure 22

5.8  CO
CO is the opener and breaks the sentence into clauses.

<clause-> must be testable. Generally, <clause+> is only an opener

If so, replace it with the appropriate intent:

<intent->

Verify <intent-> happens <clause+> apparently, the system should print the report

```
+-----*CO-*----+          *----*Os-*----*
+--Xc-+  +--Ds-+--+--Ss--+---T---+  +-Ds-+
|     |  |     |  |      |       |  |    |
apparently , the system.n should.v print.v the report.n (S (PP apparently)
   (S (NP the system)
      ould
      P print
        (NP the report)))))
```

<Intent> Verify <agent->:: the system

Is <N> able to <action->:: print

<object->:: the report

Verify the <intent> happens <apparently>

Figure 23

5.9 AND / OR

The system 102 will identify sentences that can be independently split around the 'and'

5.9.1 VJ*t

*t indicates it is a tansitive verb and must take an object. This means that there should be no object in the sub-domain of VJl or VJr (i.e. the object is reachable only through VJl or VJr).

If this is not the case, i.e., the link is showing VJ*t, but there is an object island with one of the VJ, the system 102 may take the next complete linkage from the parser until this is resolved.

i.e., the system 102 now has a link, where there are no object islands.

Then the system 102 breaks the sentence as follows:

<Clause1>: All words except that are only reachable by VJrt. Remove the l- word

<Clause2>: All words except that are only reachable by VJlt. Remove the l- word

Put the respective intents. (Note: the word indicated by l- must not be part of the sentence)

The system should be able to add or delete data from the table (Note: the second link gives this:)

Clause1: the system should be able to add data from the table
Clause2: the system should be able to delete data from the table <Intent1>: Verify <agent>:: the system Is/are <N> <ADJP>:: able <action>:: to add <object>:: data Verify the <action> to add Of the <object>:: data Happens <PP> from <NP>:: the table <Intent1>: Verify <agent>:: the system Is/are <N> <ADJP>:: able <action>:: to delete <object>:: data Verify the <action> to delete Of the <object>:: data Happens <PP> from <NP>:: the table <Intent1>: Verify <agent>:: the system Is/are <N> able to <action1>:: print <object1>:: the document <Intent2>: Verify <agent>:: the system Is/are <N> is able to <action2>:: dispatch {<object2>}-> if <object2> is Ox put <object1> in brackets:: it (the document)

<Intent3>:: Verify <Intent1> <I->:: and <Intent2> can occur

The system should print the document and dispatch it to the user

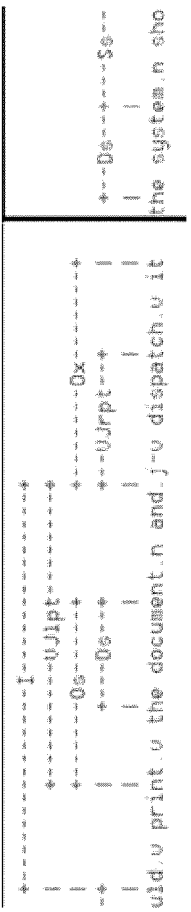

*i indicates intransitive verb. Both of VJli VJri must have an object associated with it.

If this is not the case, i.e. the link is showing VJ*t, but there is an object island with one of the VJ, the system 102 may take the next complete linkage from LG till this is resolved.

The system 102 may divide into clauses as follows:

<Clause1>: remove I- word and all words reachable only through VJri

<Clause2>: remove I- word & all words reachable only through VJ*l+ word

The system 102 may then run independent sentences with the associated intent template. Conjoin the templates with the I- link The system should print the document and dispatch it to the user Clause1: the system should print the document Clause2: the system should dispatch it to the user <intent1>: Verify <agent>:: the system Is/are <N> able to <action1>:: print <object1>:: the document <intent2>: Verify <agent>:: the system Is/are <N> is able to <action2>:: dispatch {<object2>} -> if <object2> is Ox put <object1> in brackets:: it (the document)

<intent3>: Verify the <action>:: dispatch

Of <Object>:: it ((the document)

Happens <PP>:: to <NP>:: the user

MJ connects the prepositions together. When MJl,r occurs, one of them (generally MJr) should break the sentence into two distinct pasts. If the word connected by MJr- can be reached without going through MJr, then the system 102 gets the next link.

the user should select the option below 10 but above 5

<Clause 1>: Remove words that are only connected by MJr

The user should select the option below 10

<Clause 2>: Remove words that are only connected by MJl

The user should select the option above 5

Verify <Clause1> and <clause2>

Note: The system 102 may consider "but" as an "and".

The user must be able to add rules or rulesets below the top level ruleflow and within the top level ruleflow packages The system 102 may keep iterating trying to fix the VJi and MJr, until it encounters the right SJ for the rule & rule set.

Figure 27

Examples: MVs-Cs

Intent: Verify <agent>:: the usable fuel

<action>:: falls

<object>::below 15 %

Intent: Verify <agent>:: the module is able to <action> illuminate

<object> the low-fuel warning error

Intent:

Verify < Intent – 1 > leads to < Intent – 2 >

ANALYSIS SYSTEM FOR TEST ARTIFACT GENERATION

BACKGROUND

1. Priority Claim

This application claims the benefit of priority from Indian provisional patent application no. 1370/CHE/2011 filed Apr. 21, 2011, and from Indian provisional patent application no. 1613/CHE/2011 filed May 10, 2011, both of which are incorporated by reference.

2. Technical Field

This disclosure relates to test automation. More specifically, this disclosure relates to assisted generation of early test analysis and design artifacts from natural language (e.g., English language) specification documents.

BRIEF DESCRIPTION OF THE DRAWINGS

The system may be better understood with reference to the following drawings and description. In the figures, like reference numerals designate corresponding parts throughout the different views.

FIGS. 12-27 illustrate examples of the application of various rules by the system to requirement statements.

DETAILED DESCRIPTION

Figure 1:
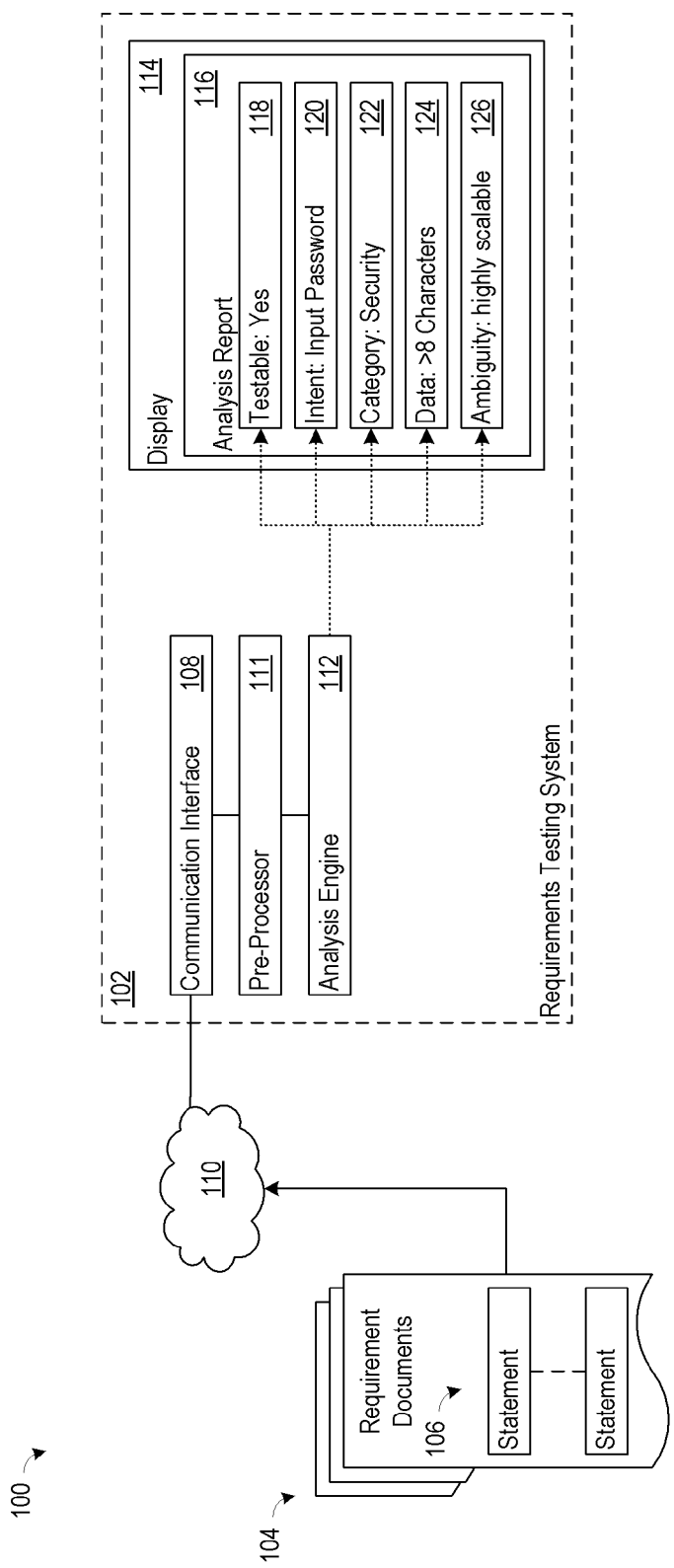
FIG. 1 illustrates a requirements testing system architecture.

FIG. 1 illustrates a requirements testing system architecture 100. The architecture 100 includes a requirements testing system 102 ("system 102"), an implementation of which is described in more detail below. The system 102 analyzes requirement statements to determine test artifacts. To that end, the system 102 receives requirement documents 104 including requirement statements 106. The system 102 may obtain the requirement documents 104 through the communication interface 108. The communication interface 108 may connect to networks 110 to obtain the requirement documents 104 from local or remote sources.

The network 110 may follow any of a wide variety of network topologies and technologies. As examples, the network 110 may include Local Area Networks (LANs), Wide Area Networks (WANs), Internet connections, Ethernet networks, or Fiber Distributed Data Interconnect (FDDI) packet switched networks that may communicate Transmission Control Protocol/Internet Protocol (TCP/IP) packets, or any data following any other communication protocol. The network 110 provides a transport mechanism or interconnection of multiple transport mechanisms supporting data exchange between the system 102 and any source of documents to analyze, including the requirement documents 104.

An analysis engine 112 in the system 102 analyzes the requirement statements to determine the test artifacts. A requirement statement may, for example, be implemented as a single sentence or other sequence of one or more words. The requirement statement may, for example, be in unconstrained natural language, structured formats, or model based formats. An example of a requirement statement in a structured format may be a requirement statement limited to subject, action and object (denoted by SAO in Link Grammar notation). Such a restriction may exclude requirement statements with multiple objects, or requirement statements with nouns which are neither subjects nor objects. Other examples are possible.

In some instances, the requirement statements may include data that is not intended for processing. Such data may be marked, e.g. the data not intended for processing may be enclosed in brackets. The requirement statements may first be processed by the preprocessor 111 as described in more detail below. Among other things, the preprocessor 111 may remove data enclosed in brackets as well as the brackets themselves. The analysis engine 112 may generate, e.g., on the display 114, an analysis report 116. The analysis report 116 may specify the test artifacts or any other analysis details that the system 102 determines.

An artifact may be a tangible by-product produced during the development of software (e.g. a use case or a class diagram). Artifacts of a software project may be or resemble deliverables of the software project, though the software itself (i.e. the released end-product) may not be an artifact. A test artifact may be a tangible by-product produced during software testing. Test artifacts may relate to a characteristic of a requirement statement. Examples of test artifacts may include an indication of one or more of the following: requirement testability, requirement intent, requirement category, requirement data and requirement ambiguity. Testability artifacts, intent artifacts, category artifacts, and data artifacts may be examples of test artifacts, as well as or alternatively an ambiguous phrase identified in a requirement statement. For example, the test artifacts may include: Testability 118, specifying, for example, whether the requirement statement is testable; Intent 120, specifying, for example, the intent or purpose of the requirement statement; Category 122, specifying, for example, what type of requirement the requirement statement establishes; Data 124, specifying, for example, the data that the requirement statement operates on; and Ambiguity 126, specifying whether all or parts of a requirement statement are ambiguous with regard to its testability. The system 102 may determine additional, fewer, or different artifacts, including grammatical correctness of the requirement statement in whole or in part.

FIGS. 2-9 give examples of the types of analyses that the system 102 may carry out. Specific examples of rulesets that the system 102 may implement to execute the analyses and determine the test artifacts are given in detail below.

Figure 2:
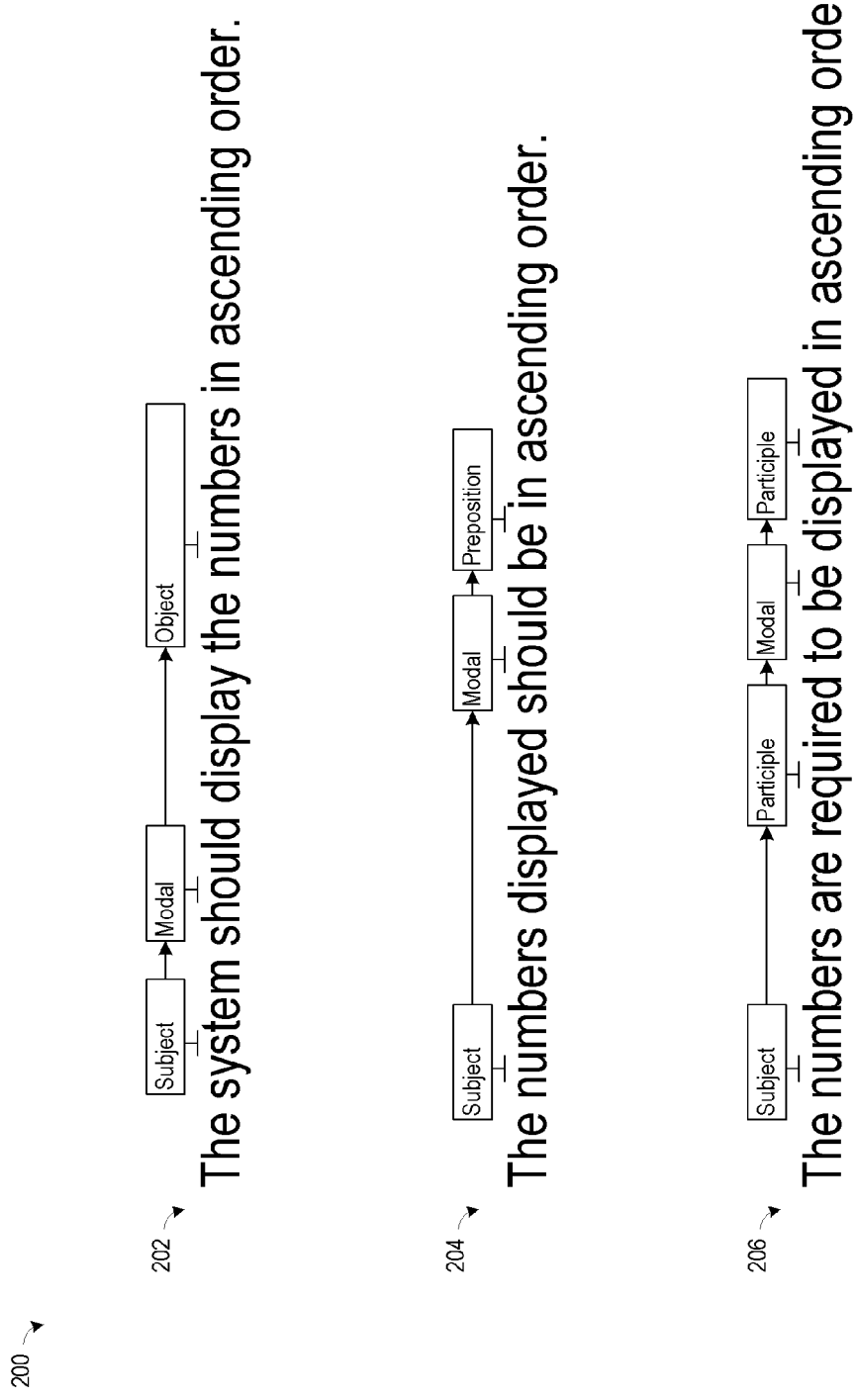
FIG. 2 shows examples of determining testability artifacts for requirement statements.

FIG. 2 shows examples 200 of determining testability artifacts for requirement statements. In one implementation, the system 102 recognizes testable requirement statements as those that involve the use of modal verbs and that follow, as examples, one or more of the following properties governing the relation of the modal verbs with other words:

(1) Modal verbs connect to the subject and object, as in the requirement statement 202: "The system should display the numbers in ascending order." (2) Modal verbs connect to the subject and a preposition or participle, as in the requirement statement 204: "The numbers displayed should be in ascending order." (3) The modal verb connects to the subject through a participle and in turn connects to an object/preposition/participle, as in the requirement statement 206: "The numbers are required to be displayed in ascending order."

Not all requirement statements are testable. For example, "Project staffing report is defined as a report containing information about the project name, project description, total employee count, staffing status." The system 102 determines that this statement is not testable because none of the testability rules fire. One reason is that this requirement statement gives the definition of the report, but does not tell how the report can be generated. As such, the requirement statement fits better into the assumptions section of the requirement document. Another example is, "Resource allocation request is associated with only one role." This requirement statement is not clearly a requirement to be coded or a logical association made by the requirement writer. If it is to be encoded, it is better phrased included a modal verb, such as, "The resource allocation request should be associated with only one role."

Figure 3:
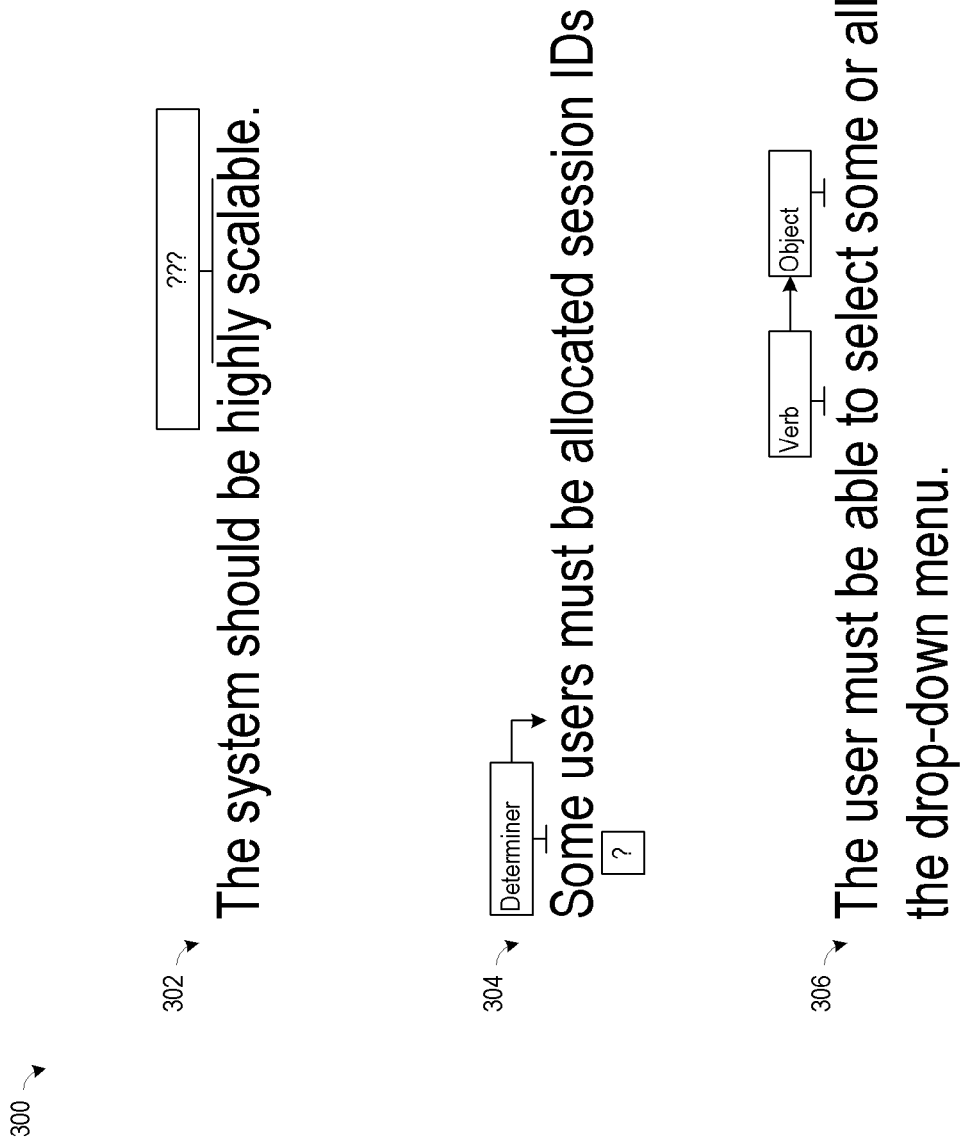
FIG. 3 shows additional examples of determining testability artifacts for requirement statements.

FIG. 3 shows additional examples 300 of determining testability artifacts for requirement statements. The system 102 may identify ambiguous phrases of requirement statements, such as "highly scalable" in the requirement statement 302 by analyzing the semantics of words in the requirement statement which are classified in one or more parts of speech, such as adjectives, adverbs, and/or other parts of speech. The system 102 also recognizes that the mere presence of a word does not imply ambiguity, as in the requirement statement 304, where the ambiguity of the word "some" is resolved because it unambiguously modifies "users." The system 102 may also make a decision concerning ambiguity by analyzing the usage of a word in relation to others, as shown in the requirement statement 306. An example implementation of a testability ruleset for the system 102 for performing analyses such as those noted above in FIGS. 2 and 3 is given below.

Figure 4:
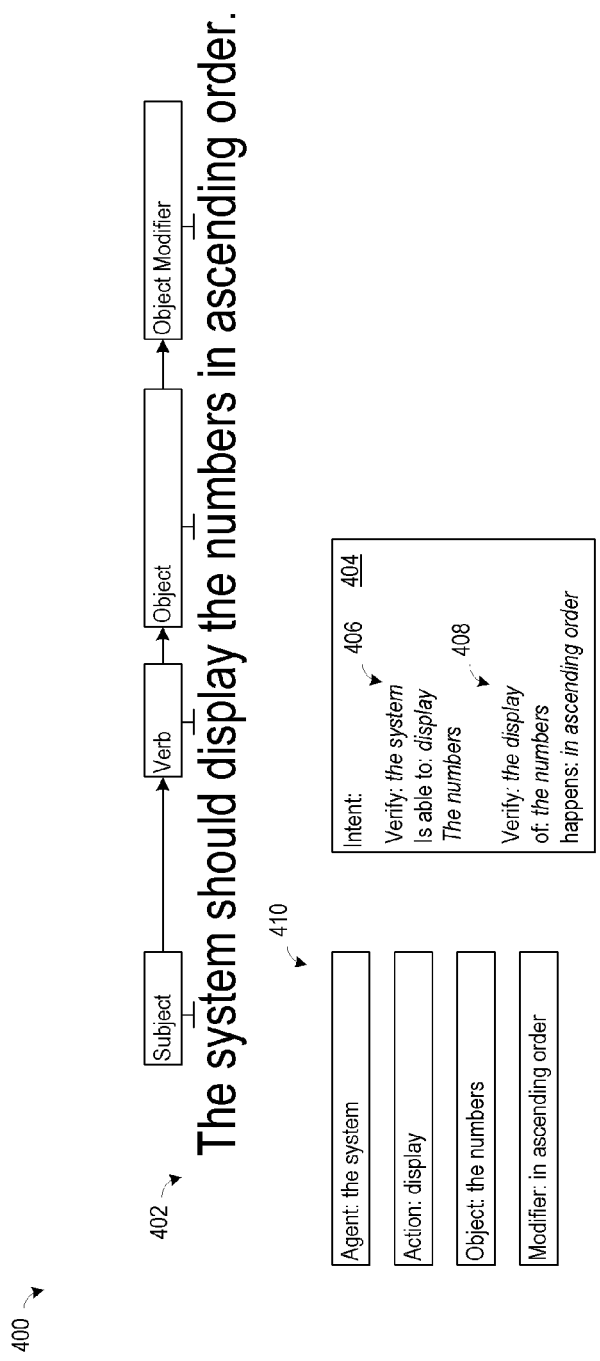
FIG. 4 shows an example of determining an intent artifact for a requirement statement in active voice.

FIG. 4 shows an example 400 of determining an intent artifact 404 for a requirement statement 402 in active voice: "The system should display the numbers in ascending order." In this example, the intent artifact 404 that the system 102 determined includes a first intent 406 to verify that the system is able to display the numbers, and a second intent 408 to verify that the display of the numbers happens in ascending order. To determine intent, the system 102 may determine other characteristics 410 of the requirement statement, such as the agent, action, object, and modifier.

Figure 5:
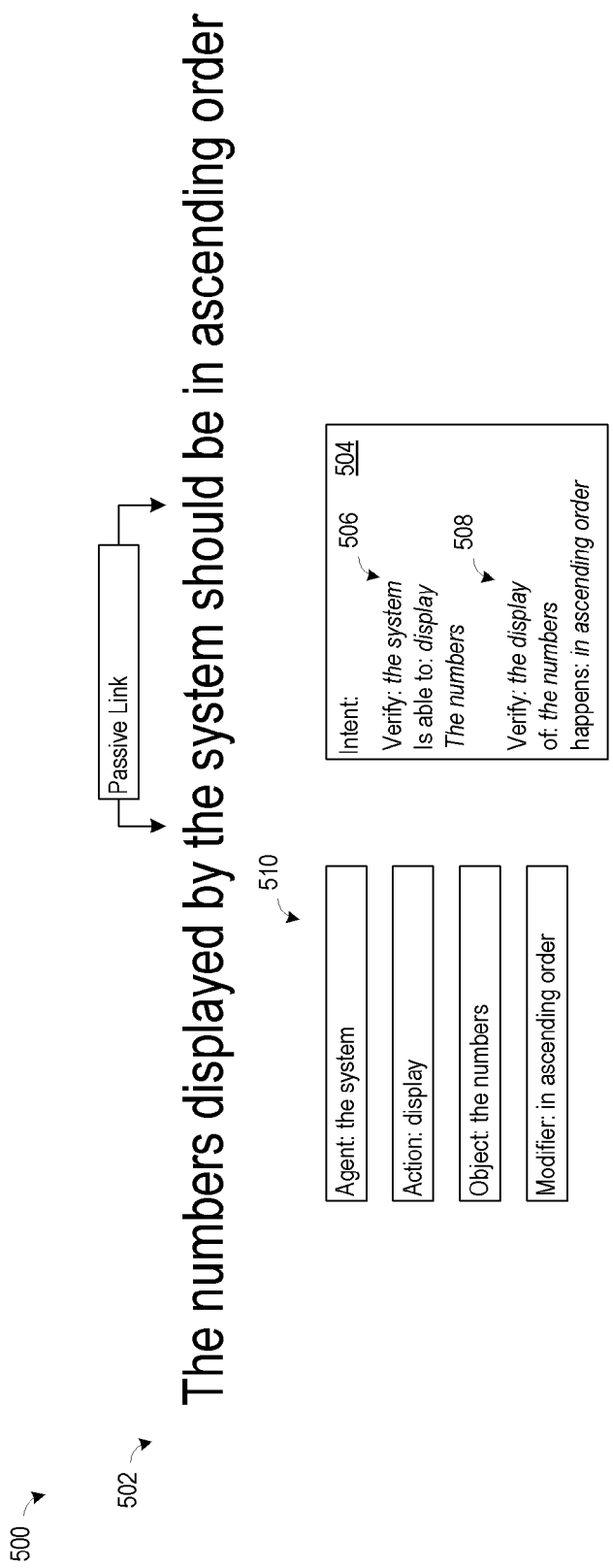
FIG. 5 shows an example of determining an intent artifact for a requirement statement in passive voice.

FIG. 5 shows an example 500 of determining an intent artifact 504 for a requirement statement 502 in passive voice: "The numbers displayed by the system should be in ascending order." In this example, the intent artifact 504 that the system 102 determined includes a first intent 506 to verify that the system is able to display the numbers, and a second intent 508 to verify that the display of the numbers happens in ascending order. To determine intent, the system 102 may determine other characteristics 510 of the requirement statement, such as the agent, action, object, and modifier.

A compound sentence or statement may be a sentence or statement that has multiple subjects. A simple sentence or statement may be a sentence or statement that has a single subject. A subject may be a word, phrase or formal expression about which something is predicated. The subject may be, for example, a noun, noun phrase or noun substitute.

Figure 6:
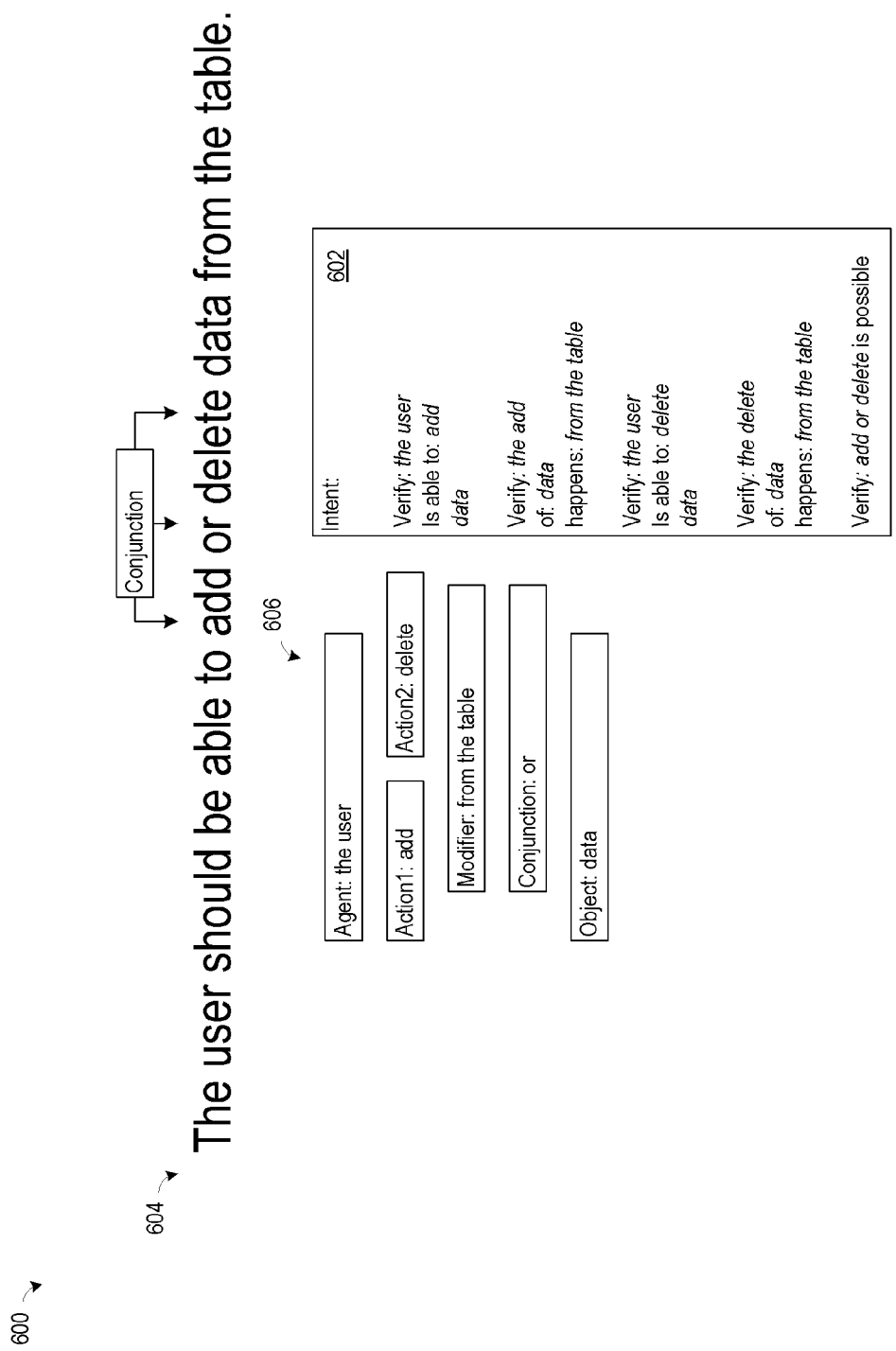
FIG. 6 shows an example of determining an intent artifact for a compound requirement statement.

FIG. 6 shows an example 600 of determining an intent artifact 602 for a compound requirement statement 604: "The user should be able to add or delete data from the table." The intent artifact 602 that the system 102 determined includes multiple intents that the system 102 extracted from the compound requirement statement: 1) Verify that the user is able to add data; 2) Verify the add of data happens from the table; 3) Verify the user is able to delete data; 4) Verify the delete of data happens from the table; 5) Verify that add or delete is possible. As with the examples above, the system 102 may determine other characteristics 606 of the requirement statement, such as the agent, multiple actions, a modifier, conjunction, and object.

Figure 7:
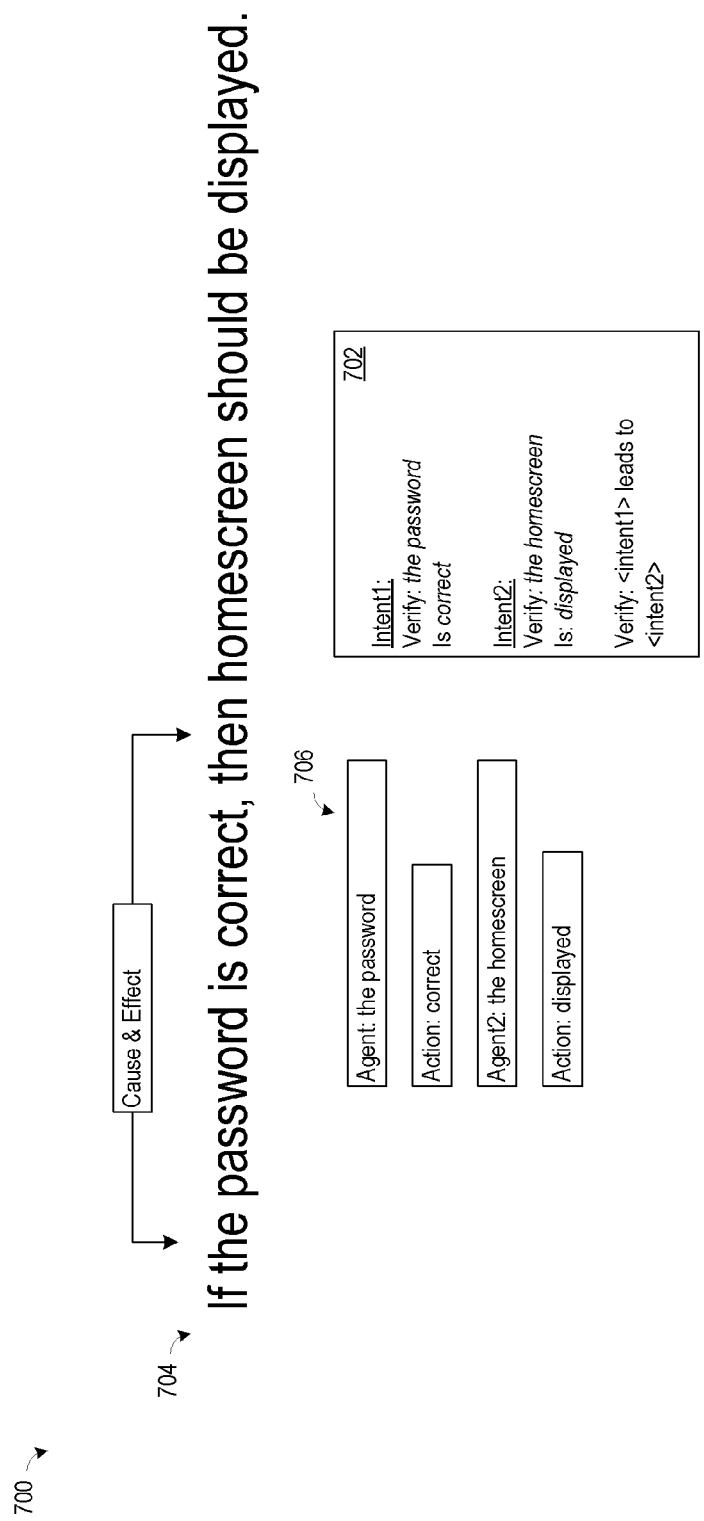
FIG. 7 shows an example of determining an intent artifact for a requirement statement with dependent clauses.

FIG. 7 shows an example 700 of determining an intent artifact 702 for a requirement statement 704 with dependent clauses: "If the password is correct, then homescreen should be displayed." The intent artifact 702 includes two intents in this example: 1) Verify the password is correct; 2) Verify homescreen is displayed and the overall intent 3) Verify that <intent1> leads to <intent2>. Again, the system 102 may determine other characteristics 706 of the requirement statement, such as the agents and actions.

An intent may, for example, be a logical step that must be executed in order to perform a test. The intent may be the most atomic unit that conveys enough information for a test to be made. In some cases, the intent may be a set of words along a path of links bounded by noun phrases. The intents of a requirement statement may be represented by an intent artifact. The links of the requirement statement identified by a grammatical parser may be traversed in order to identify the intents. A grammatical parser may, for example, be implemented as a syntactic parser or a dependency parser, such as a dependency parser with an extensible dictionary. Static text may be added to each intent through an intent template, i.e. action, (discussed in more detail below) in order to maintain the meaning of the intent. Identifying test intents may increase the comprehensibility of the requirement statement by breaking the requirement statement into individual testable components, such as test steps corresponding to the requirement statement. Intents may be useful when analyzing long requirement statements and/or may be used to remove syntactic ambiguity (such as ambiguity arising from the structure of the requirement statement). Intents may also act as a proxy to estimate the amount of testing effort needed to test a requirement statement. Other uses may be possible.

Figure 8:
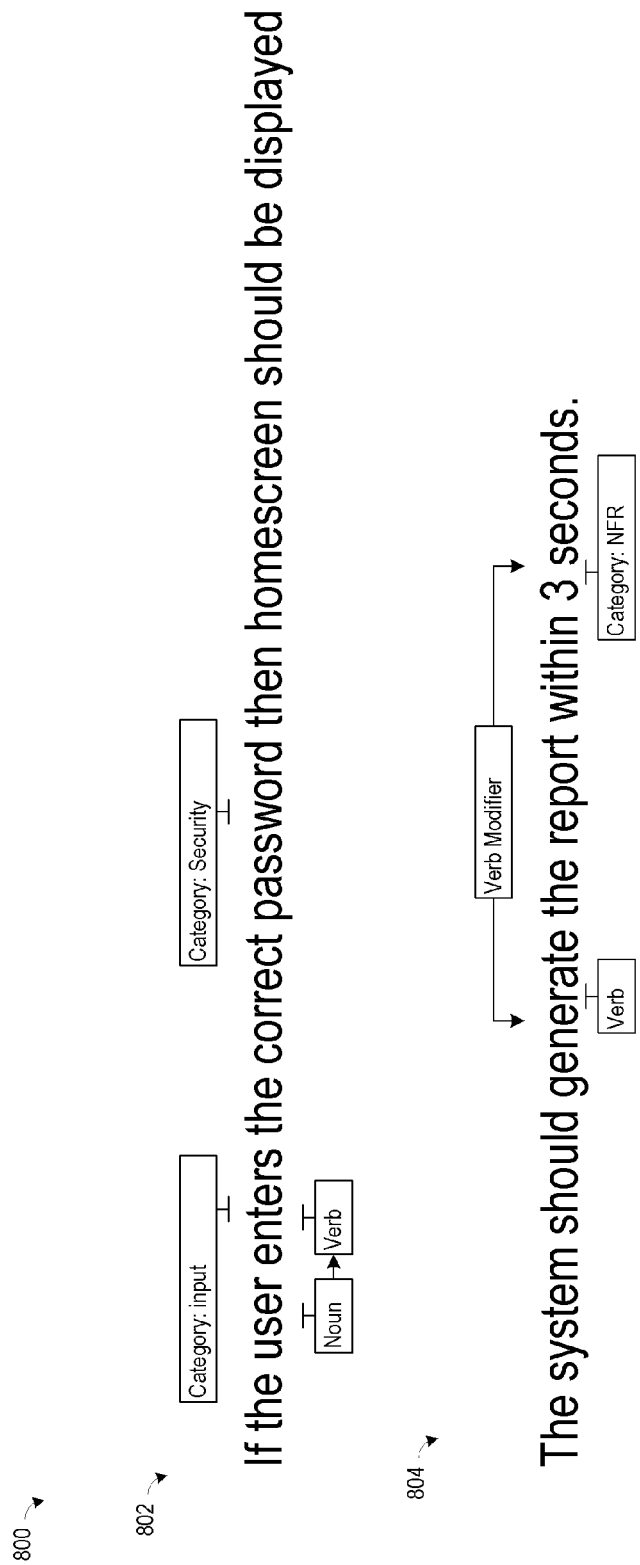
FIG. 8 shows an example of determining a category artifact for requirement statements.

FIG. 8 shows examples 800 of determining category artifacts for requirement statements. Possible categories may, for example, include a) Input/Output, b) Intermodule, c) Security, d) Usability, e) Conformance, f) Dependency, g) Non-Functional (NFR), and h) Business Logic, and/or various other categories.

In the first requirement statement 802, the system 102 determines that two applicable categories are Input and Security. The Input category is applicable due to the noun/verb construct "user enters," while the Security category is applicable due to the presence of the word "password." In the requirement statement 804, the system 102 determines that the applicable category is Non-Functional Requirement (NFR), due to the presence of the non-functional requirement "within 3 seconds." A NFR may define characteristics such as performance, availability, or other non-functional aspects, as opposed to functional or behavioral aspects.

In some systems, it may be useful or necessary to determine whether the requirement statement can be categorized as NFR, Input/Output, or Intermodule. Syntactic patterns and semantic rules may be used to determine whether the requirement statement is in the 'Input/Output' or 'Intermodule' category. For example, a requirement statement in one of these two categories may be characterized by two noun phrases connected by either a verb or an adverb. According to a more specific example, if both the noun phrases are "system" nouns, the category may be 'Intermodule'. If one of the nouns is a "person noun", the requirement statement may be categorized as 'Input/Output'. Semantic rules may be used with a category glossary 1030 to determine what constitutes "system nouns", and "person nouns".

In some systems and methods, a requirement statement may be categorized as Security if any phrase from a security glossary is present in the requirement statement. Other examples are possible.

Figure 9:
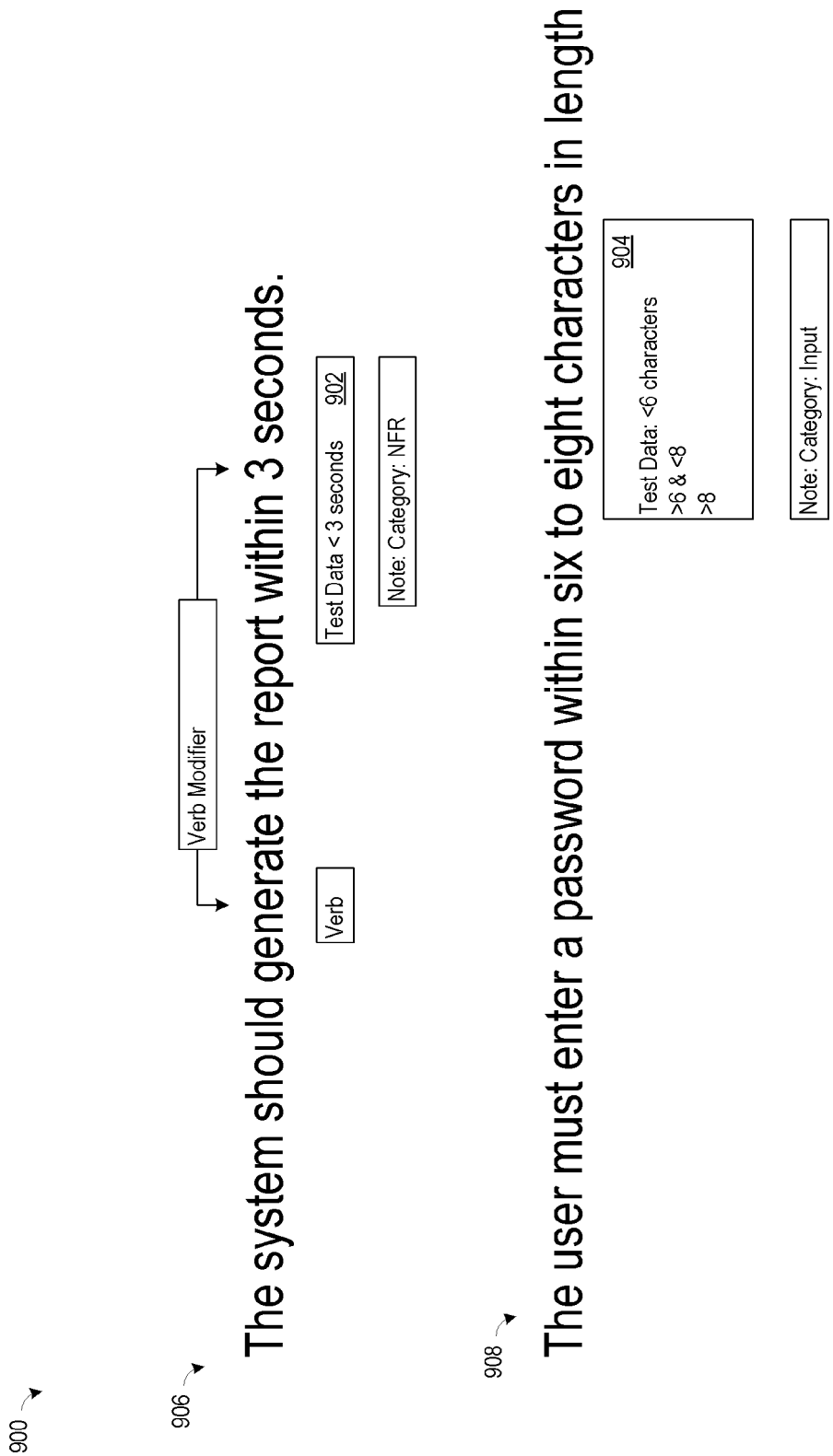
FIG. 9 shows an example of determining a data artifact for requirement statements.

FIG. 9 shows examples 900 of determining data artifacts 902 and 904 for requirement statements 906 and 908 respectively. In particular, the system 102 has determined that the data artifact 902 should be: test data "<3 seconds", which gives criteria and data for testing the code that implements the requirement statement 906. Similarly, the system 102 has determined that the data artifact 904 should be: test data >6 characters and <8 characters.

Figure 10:
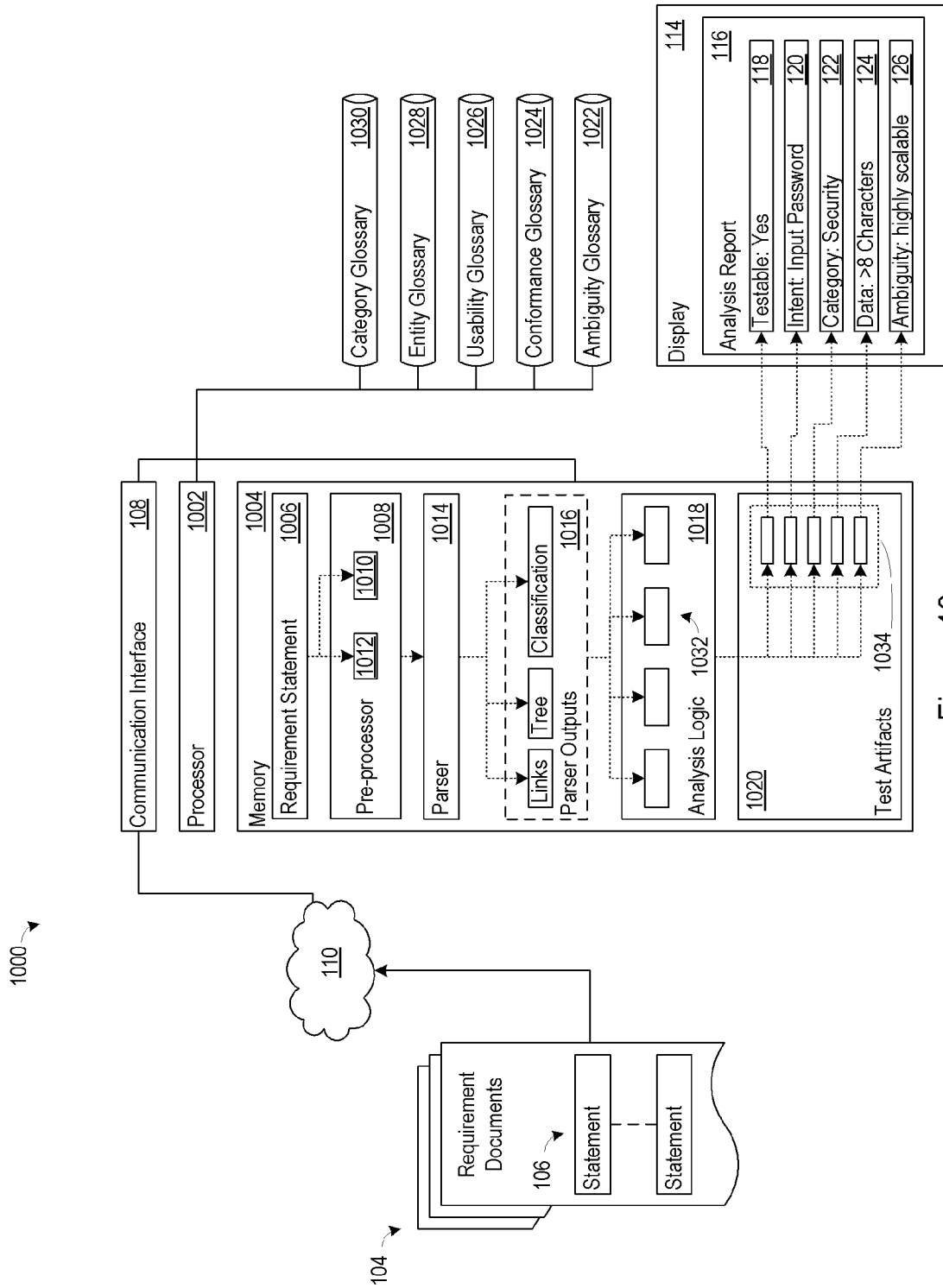
FIG. 10 shows a requirements testing system.

FIG. 10 shows one example implementation of the requirements testing system 102. As an overview, the system 102 may include a natural language parser which provides parts of speech and relational links between words. In one implementation, the system 102 employs the Link Grammar (LG) Parser from CMU (available at http://www.link.cs.cmu.edu/link/). The examples below are expressed in terms of the LG parser nomenclature, however, the system may instead implement other parser logic and corresponding rulesets. The link types are summarized at http://www.link.cs.cmu.edu/link/dict/summarize-links.html, and more detail is given in individual web pages for each link type named following a regular pattern and building from the root URL http://www.link.cs.cmu.edu/link/dict/. For example, additional information on the SI link may be found at http://www.link.cs.cmu.edu/link/dict/section-SI.html.

The system 102 may also include a set of pattern matching rules which identify link structure patterns, referred to as primary structures, that determine test artifacts including the initial intents of the requirement statement. In addition, a set of extended rules identify extensions to the initial intents to provide secondary intents. The extended rules may analyze noun, verb modifiers, gerunds and other modifiers, as examples. A set of entity mapping rules maps noun phrases and verb phrases to a keyword list or glossary to categorize requirements into test categories. The system 102 may also include a set of quantifier constraints (and other modifiers) that identify test data and logic to generate a test data range. Example implementations of the rulesets are provided in the tables below. The system 102 may implement additional, fewer, or different rulesets to analyze requirements statements for additional, fewer, or different test artifacts.

In some systems and methods, the rules in a ruleset may specify a contiguous set of links that must be present in a requirement statement. For example, the testability ruleset may specify a contiguous set of links that must be present in a requirement statement in order for the requirement statement to be classified as testable. Other examples are possible.

The system 102 may include a processor 1002 and a memory 1004 (with logic for execution by the processor 1002) that implement the analysis engine 112. The system 102 receives (from either local or remote sources) and stores in the memory 1004 a requirement statement 1006 for analysis. Preprocessor logic 1008 may first filter each requirement statement 1006.

The preprocessor logic 1008 includes preprocessing rulesets (e.g., the preprocessing rulesets 1010 and 1012). The preprocessing rulesets cause the preprocessing logic 1008 to perform analysis, modification, or other actions on requirement statements. Table 1 and Table 2 give examples of the preprocessing rulesets.

TABLE 1

Preprocessor Ruleset

Rule1: Prune ending punctuation marks.
Rule 2: Convert Unicode text to ASCII text
Rule 3: Convert URLs in text into an Acronym
Rule 4: Replace quoted words into Acronyms. Replace other words which are in title case with Acronyms.
Rule 5: Add a space before and after a comma (if not present)
Rule 6: Remove extra white spaces
Rule 7: Remove text enclosed in brackets and the brackets themselves
Rule 8: Replace terms in the entity glossary with Acronyms
Rule 9: Convert the sentence to lower case.

TABLE 2

Preprocessor Ruleset

Rule: Replace won't –> would not
Rule: Replace can't –> can not
Rule: Replace mustn't –> must not
Rule: Replace couldn't –> could not
Rule: Replace shouldn't –> should not
Rule: Replace cannot –> can not
Rule: Replace needn't–> need not
Rule: Replace wouldn't–>would not
Rule: Replace "no later than" with "by"
Rule: Replace "no sooner than" with "after"
Rule: Replace "less than", "lesser than", "lower than", "fewer than" with "<"
Rule: Replace "as many as", "as much as", "up-to", "at most", "some", "about", with <=
Rule: Replace "more than", "greater than", "higher than", "further than", "just over", "well over", "" with >
Rule: Replace "at least" with >=

In some instances, when the preprocessor logic 1008 converts the words in the sentence to lower case, the words (e.g., when they are acronyms) may not be recognized as valid entries in the parser logic dictionary. To address this situation, the system 102 may modify the parser logic dictionary to treat all unknown words as a noun, and associate with the unknown words with the links given to recognized nouns. The system 102 may also handle verbs used as nouns, as with the word "update" in the example "The system should disable the update button." In one implementation, the system 102 identifies as dual use words those words that may be used both as a verb and as a noun, updates the parser logic dictionary to indicate that the dual use words may be used as both a verb and a noun, and associates the links given to verbs and nouns with the dual use words. Words may be identified as dual use words in many ways, such as by scanning a dictionary or other grammatical database such as the Word Net™ database (wordnet.princeton.edu). Identifying dual use words in the parser logic dictionary may be advantageous in some instances, such as where a requirement statement might not otherwise be properly parsed, like where a noun may be incorrectly identified as a verb.

The pre-processed requirement statement is passed onto the parser logic 1014. If no linkages are found by the parser logic 1014 (null count>0), the system 102 highlights the requirement statement as grammatically incorrect. If the parser logic 1014 has found a complete linkage, then the parser output, including grammatical links between words and phrases, the constituent tree and the classification of words into the parts of speech (which may be based on the suffix put after the input words) are saved in memory 1004. The constituent tree may classify the words in the requirement statement into parts of speech and arranges words into phrases. The parser output may be evaluated by the analysis logic 1018, including, for example, by submission of the parser output and requirement statement 1006 as input data to one or more analysis rulesets 1032. The rules within the analysis rulesets that fire on the input data indicate the test artifacts 1020 for the requirement statements.

Furthermore, the analysis logic 1018 may reference one or more glossaries, such as, for example, the ambiguity glossary 1022, conformance glossary 1024, usability glossary 1026, entity glossary 1028, and category glossary 1030 as noted in the rules below to facilitate processing the requirement statement 1006. The glossaries may be leveraged from the document commenting and analysis applications (DARAs) identified below and incorporated by reference.

The example analysis rulesets given below show the condition to be checked on the parser outputs 1016 of the parser logic 1014, the corresponding action to be taken, and whether a specific test artifact 1034 is determined. The examples referred to by number in the tables are found in the drawings. For instance, Examples 5.1, 5.1.1, and 5.1.2 are found in FIG. 12.

TABLE 3

Testability Ruleset
If any of the following rules fire the analysis logic 1018 determines that the requirement statement is testable, otherwise the requirement statement is untestable. The analysis logic 1018 may then proceed to determine ambiguity, intent, categorization and data artifacts.

| Rule ID | Rule | Rule in LG nomenclature | Examples |
|---|---|---|---|
| T.1 | Subject - Modal -Verb - Object | S-I*-O | 5.1, FIG. 12 |
| T.2 | Subject-Modal-Passive Verb-Prepositions | S-Ix-P* | 5.3, FIG. 19 |
| T.3 | Subject - Modal - Passive Verb - Prepositions | S-Ix-OF | 5.4, FIG. 20 |
| T.4 | Subject-Participles-'in order to'-Modal-Verb-Object | S-Pv-TO-I*-O | 5.5, FIG. 21 |

The system 102 may recognize a testable requirement statement based on whether the testable requirement statement includes a modal verb represented with links "I" (rule IDs T.1 and T.4) and "Ix" (rule IDs T.2 and T.3) in Table 3. For example, the requirement statement may be determined to be testable based on the presence of contiguous links, e.g. S-I-O (rule ID T.1). The linkage S-I-O denotes that a subject (link S) should connect to a modal verb (link I) which in turn should connect to an object (link O). In some configurations, the requirement statement may be determined to be testable based on the presence of a combination of 8 links, as shown in Table 3 (i.e. links S, I, Ix, P, O, OF, Pv, TO, as specified in LG nomenclature in Table 3). Other examples are possible.

Sentence Simplification Ruleset

Figure 38:
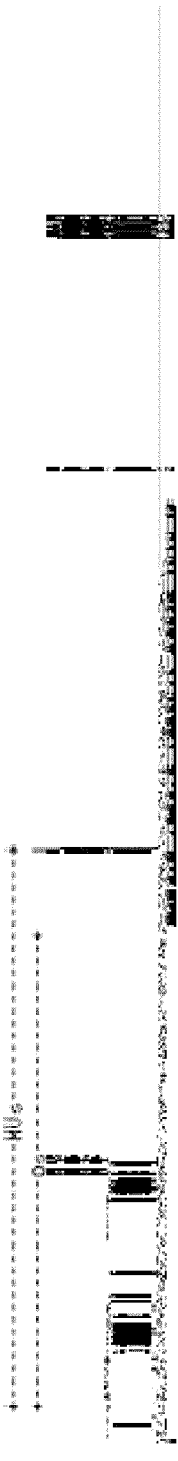
FIGS. 38 and 39 illustrate examples of the application of various rules by the system to requirement statements.
Figure 39:

| Rule Id | Rule | Rule in LG Nomenclature | Breakup/simplification | Examples |
|---|---|---|---|---|
| S.1 | Sentences of type dependency (with antecedent and consequent) | MVs-Cs | Break the sentence into two clauses, <clause-> & <clause+>. <clause-> starts from the sentence beginning up to the word before the Cs+ word. Skip the Cs+ word. This word is recorded for use in Intents <clause+> starts from the Cs- word beginning up to the end of the sentence. | FIG. 38 |
| S.2 | Sentence openers | CO, CO*s | Break the sentence into two clauses, <clause-> & <clause+>. <clause-> is the set of words that can be reached from CO*s+. <clause+> that can be reached through CO*s-. Record the Type of breakup with the word pointed by CO*s | 5.6 FIG. 21 |

-continued

| Rule Id | Rule | Rule in LG Nomenclature | Breakup/simplification | Examples |
|---|---|---|---|---|
| 1.2 | Independent clauses | CC, Xx | Break the sentences into two clauses. <clause–> is the set of words that can be reached from CC–. <clause+> is the set of words that can be reached through <CC+>. Similar operation for Xx | 5.7 FIG. 22 |
| 1.4 | Conjunctions (Verb, Noun, Prepositions, adverbs) | VJ, MJ, RJ, SJ | Break the sentence into two clauses, <clause–> & <clause+>. <clause–> starts with the sentence beginning up to Jl+ word. It then continuous from the word after Jr– up to the end of the sentence. <clause+> starts with the sentence beginning up to the word before Jl–. It then continuous from the Jr– word up to the end of the sentence. | 5.9 FIG. 24, 25, 26, 27 |
| 1.5 | Sentence with "Neither - Nor" | SJn | If the Sentence contains an <N> link, flag as error and proceed to the next analysis. Find the word (other than SJr) that connects to the SJn– word. Introduce 'not' after this word. Remove the Dn+ word. Replace SJn– with 'and' | 5.1.1 FIG. 12 |
| 1.6 | Relative Clauses | B-R-RS, B-R-Cr | Break the sentence into two clauses, <clause–> & <clause+> at the B link. <clause–> contains the words reachable from the B+ word but not connected to the B– word. <clause+> starts with the B+ word. Include a determiner 'the'; delete the word with the R– link. Continue till the end of the sentence. | |

TABLE 4

Ambiguity Ruleset

| Rule ID | Rule | Rule in LG nomenclature | Examples |
|---|---|---|---|
| T.A.1 | Identify word acting as an adjective | A, AJl, AJr, Ma, Pa, MJla, MJra | |
| T.A.1.1 | Check if the word is not present in the non-ambiguous list (e.g., by checking the glossary for unambiguous terms)- if so, the system 102 marks the word as ambiguous | — | Described below with regard to the ambiguity checker and ambiguity glossary. |
| T.A.2 | Identify adverbs | EA, MVa, RJl, RJr, EN, EE, EC, El | |
| T.A.2.1 | Check if the word is not present in the non-ambiguous list - if so, the system 102 marks the word as ambiguous | — | Described below with regard to the ambiguity checker and ambiguity glossary. |

TABLE 4-continued

Ambiguity Ruleset

| Rule ID | Rule | Rule in LG nomenclature | Examples |
|---|---|---|---|
| T.A.3 | Identify determiners to nouns | Dmc*, Ds, p | |
| T.A.3.1 | Check if the word is not present in the non-ambiguous list - if so, the system 102 marks the word as ambiguous | — | Described below with regard to the ambiguity checker and ambiguity glossary. |
| T.A.4 | Identify the presence of ambiguous modal verbs | l*m, lfm, lcm | |
| T.A.4.1 | If the link is present, mark the modal word attached to the link as ambiguous | | |
| T.A.5 | Identify Adverbs connected to E | E | |
| T.A.5.1 | If such words have a type ".a" or nothing, then we check if the word is not present in the non-ambiguous list - if so, the system 102 marks the word as ambiguous | | |

When a particular rule fires for a parsed sentence, the system 102 generates a corresponding intent template (e.g., "Verify <NP> was <VP> <MV:CT>"). The system 102 fills the template with appropriate words from the constituent tree of the sentence. The system 102 may implement a set of rules developed over any set of example sentences created for setting up the system 102. With regard to notation, the notation <L:T> denotes the phrase encapsulated within the tag 'T' in the constituent tree. Any word of the phrase should have a link 'L'. The link 'L' may specify (e.g., using the '+' or '−' flag) whether the system 102 should analyze the start or the end of the link.

TABLE 5a

Intent Ruleset

| Rule ID | Primary Rule | Secondary Rule | Primary Rule in LG nomenclature | Secondary Rule in LG nomenclature |
|---|---|---|---|---|
| I.1 | Subj-Modal-Verb--Object | — | S-l-O | |
| I.1.2 | | Noun Modifiers—Adjectival; Prepositional; Participle; Gerund | | <NP>-Ma <NP>-Mp <NP>-Mv <NP>-Mg |
| I.1.4 | | Noun modifiers—infinitive 'to'-object | | <NP>-TO-l-O |
| I.1.4.1 | | | | <:NP>-<:VP>-MV |
| I.1.5 | | Noun modifiers—preposition-infinitive | | TO-l |
| I.1.7 | | Verb Modifiers—Adverbs; Adjectival | | l-E l-MVa |
| I.1.8 | | Verb Modifiers—Prepositions; | | l-MVp l-PP |
| I.1.9 | | Verb Modifiers—conjunctions | | l-MVs |
| I.1.10 | | Verb Modifiers—"in order to" | | l-MVi |
| I.1.11 | | Verb Modified by forms of 'be' | | l-Pp |
| I.2 | Subject - Modal - Forms of Verb "be" - Object | | S-lf-O | |
| I.2.1 | | Noun modifiers—Infinitive 'to'-object | | TO-l-O |
| I.2.2 | | Noun modifiers—Infinitive 'to' | | TO-l |
| I.2.3 | | Verb modifiers—adjectival Prepositions; conjunctions | | lf-MV |
| I.2.4 | | Verb Modifiers—Connecting to noun modifiers | | lf-MV-M |
| I.3 | Subject-Modal-Passive Verb- | | S-lx | |

TABLE 5a-continued

Intent Ruleset

| Rule ID | Primary Rule | Secondary Rule | Primary Rule in LG nomenclature | Secondary Rule in LG nomenclature |
|---|---|---|---|---|
| I.3.1 | | Modal Verb Modifiers—Adjectival | | Pa |
| I.3.2 | | Modal Verb Modifiers—Participle; gerund | | Pv, Pg |
| I.3.3 | | Modal Verb Modifiers—Prepositions | | Pp, OF |
| I.3.4 | | Modal Verb Modifiers connecting to Verb Modifiers—Prepositions | | P*-MVp |
| I.3.5 | | Modal Verb Modifiers connecting to Verb Modifiers—"in order to" | | P*-MVi |
| I.3.6 | | Modal Verb Adjectival Modifier—Connecting to infinitival 'to' - object | | Pa-TO-l-O |
| I.4 | - Subject- Participles- 'in order to'- Modal-Verb- Object | | S-Pv-TO-l*-O | |
| I.4.1 | | Noun & Verb modifiers of I.1 | | All the links which S-l-O can take, can come here. |
| I.5 | Subject - Modal - Weak Verb - 'TO' - Verb - Object | | S-l(w)-TO-l*-O | |
| I.5.1 | | Noun & Verb Modifiers | | All the links which S-l-O can take come here. There would be no secondary links for the weak verb - l(w) |

TABLE 5b

Intent Ruleset

| Rule ID | Template Note: in some cases, the object may not exist - thus the entire line of the object is not included in the intent. | Meaning | Example (See FIGS. 12-27, 38-39) |
|---|---|---|---|
| I.1 | Intent: Verify <agent> Is/are <N> able to <action> <object> (E.g., Verify <S+:NP> is/are {<N–>} able to <l–> <O–: NP>) | <agent> is the noun phrase in the constituent tree, collected recursively within NP starting from the word with the S+ link. Note: the immediate keyword may be ADVP (only system A can) <action> is the verb phrase (VP) from the constituent tree <object> is the noun phrase in the constituent tree, collected recursively within NP starting from the word with the O– link. | 5.1, FIG. 12 |

TABLE 5b-continued

Intent Ruleset

| Rule ID | Template Note: in some cases, the object may not exist - thus the entire line of the object is not included in the intent. | Meaning | Example (See FIGS. 12-27, 38-39) |
|---|---|---|---|
| | | If agent is plural denoted by a subscript p (of Sp) or if there are multiple subjects (denoted by SJl & SJr), use 'are', else 'is' <N> = 'Not' when an 'N' link connects after S | |
| I.1.2 | <Base Intent> If secondary rule connected to Subject: Intent#: verify <subject> Is/are <CT>. If secondary rule connected to Object: Intent#: verify <object> Is/are <CT>. (e.g., Verify <NP> is/are <M+:CT>*) | <CT> (constituent tree): Ma: <Ma*n><ADJP><PP><NP><VP>... Mp: <Mp*n><PP><NP><ADJP><VP>... Mv: <Mp*n><VP> Mg: <Mg*n><VP> Where the new intent is started if one of the secondary links are found connected to the primary. <ADJP> is the word indicated by Ma-, MVa- <PP> is the word indicated by Mp-, MVp- <NP> is the word indicated by <J-> Is/are is similarly decided on the plurality of the Object. If Op, 'are', else 'is' | 5.1.2, FIG. 12 |
| I.1.4 | <Base Intent> {connected to subject:} Intent#: Verify <subject> Is/are able to <action2> <Object2> {connected to object:} Intent#: Verify <object> Is/are able to <action2> <Object2> (E.g., Verify <S'+NP> is/are able to <I-> the <O'-> using <O-:NP>) | <object2> & <action2> comes from l-O | 5.1.4, FIG. 13 |
| I.1.4.1 | Verify <NP> was <VP> <MV:CT> Where: <MV:CT> is If MVa: <MVa-:ADVP> If MVp: <MVp-:PP><J+:NP> If MVs: <MVs-:SBAR> If MVl: <MVl-> | | |
| I.1.5 | <Base Intent> {connected to subject:} Intent#: Verify <subject> Is/are able to <action2> {connected to object:} Intent#: Verify <object> Is/are able to <action2> | | 5.1.5, FIG. 14 |
| I.1.7 | <Base Intent> Intent# Verify the <action> Of <object> Happens <ADVP> | ADVP is the phrase in the constituent tree identified either by the E+ link or the MVa-. Note: ignore the comma if present in the ADVP | 5.1.7, FIG. 15 |
| I.1.8 | <Base Intent> Intent# Verify the <action> Of <object> Happens <PP> <NP> | PP is the phrase in the constituent tree identified with the MVp- link. NP is the phrase in the constituent tree with the J- link. | 5.1.8, FIG. 15 |

TABLE 5b-continued

Intent Ruleset

| Rule ID | Template Note: in some cases, the object may not exist - thus the entire line of the object is not included in the intent. | Meaning | Example (See FIGS. 12-27, 38-39) |
|---|---|---|---|
| I.1.9 | <Base Intent><br>Intent# Verify the <action><br>Of <object><br>Happens <WHADVP> or<br><SBAR>or<VP> | <WHADVP> is the phrase in the constituent tree identified with the MVs– link. VP is the phrase in the constituent tree with Mv– | 5.1.9, FIG. 16 |
| I.1.10 | <Base Intent><br>Intent# Verify the <action><br>Of <Object><br>Is/are able to <action2><br><object2> | <action2> is the VP from the constituent tree with the second l–.<br><object2> is the NP from the constituent tree with the O– link.<br>Note: there may be multiple O links from the l, the analysis logic 1018 may pick up all the NP and simply append them | 5.1.10, FIG. 16 |
| I.1.11 | <Base Intent><br><PP><NP> | PP is the phrase in the constituent tree identified with the Pp– link. NP is the phrase in the constituent tree with the J– link. | 5.1.11, FIG. 17 |
| I.2 | Verify <agent><br>{has} <object> | {has} logic is like this:<br>If N link is present with S– "does not have", else<br>If agent is plural - "have", else "has" | 5.2, FIG. 17 |
| I.2.1 | <Base Intent><br>To <action2><object2> | Note: the TO-l-O can be with the subject or the object | 5.2.1, FIG. 17 |
| I.2.2 | <Base Intent><br>To <action2> | Note: the TO-l-O can be with the subject or the object | 5.2.2, FIG. 18 |
| I.2.3 | <Base Intent><br><PP><NP> | <PP> is the phrase from the constituent tree connected by the MV– link<br>Similarly, the NP is the phrase with the J– link | 5.2.3, FIG. 18 |
| I.2.4 | <Base Intent><br><PP><NP><br><PP2><NP2> | <PP2> is the phrase from the constituent tree connected by the M– link<br>Similarly, the NP2 is the phrase with the J– link | 5.2.4, FIG. 18 |
| I.3 |  |  | 5.3, FIG. 19 |
| I.3.1 | Verify <agent><br>Is/are <N> <ADJP> | ADJP is the ADJP phrase in the constituent tree pointed by the Pa– link | 5.3.1, FIG. 19 |
| I.3.2 | Verify <agent><br>Is/are <N> <VP> | VP is the phrase in the constituent tree pointed by the Pv– link | 5.3.2, FIG. 19 |
| I.3.3 | Verify <agent><br>Is/are <N> <PP> | If PP is there, then the analysis logic 1018 may analyze the <PP> in the constituent tree linked by Pp– | 5.3.3, FIG. 19 |
| I.3.4 | <Base Intent><br><PP><NP><br><PP2><NP2> |  | 5.3.3, FIG. 19 |
| I.3.5 | <Base Intent><br><VP><NP> | VP is the phrase pointed by l– | 5.3.4, FIG. 19 |
| I.3.6 | <Base Intent><br>To <action> <object> |  | 5.3.5, FIG. 20 |
| I.4 | Verify <agent><br>Is able to <action><br><object> |  | 5.5, FIG. 21 |
| I.4.1 | Take the same intent as the corresponding link i.e. consider S-Pv-TO-l-O as S-l-O |  | 5.1, FIG. 12 |

TABLE 5b-continued

Intent Ruleset

| Rule ID | Template Note: in some cases, the object may not exist - thus the entire line of the object is not included in the intent. | Meaning | Example (See FIGS. 12-27, 38-39) |
|---|---|---|---|
| I.5 | Intent: Verify <agent> Is/are <N> able to <action1> <object1> <action 2> <object2> | <action1> corresponds to the first verb (which is weak) while <action2> corresponds to the next action. Similarly <object1> and <object2> correspond to the first and second objects respectively. | FIG. 39 |

With regard to categorization, the system 102 may implement categorization by identifying the occurrence of phrases and their relation to an action. The system 102 may also, as described below, leverage the categorization processing described in the document commenting, analysis, and reporting applications ("DARAs"), including U.S. Pat. Publication Nos. 2011-0022902, 2010-0005386, and 2009-0138793, which are incorporated by reference in this document in their entireties.

The system 102 may employ the entity glossary and the category keyword glossary from the DARAs, or may employ customized glossaries including additional, different, or fewer glossary entries. In particular, the entity glossary may be implemented as the agent glossary in the DARAs. An example NFR dictionary, including a logging and security section is given below in Table 12.

Table 7 shows some examples of categories that the system 102 may recognize.

TABLE 6

Category Ruleset

| Rule ID | Rule | Rule in LG nomenclature | Example |
|---|---|---|---|
| C.1 | Check if any phrase from the NFR security glossary is present in the input sentence. Tag as "Security" | — | Described below |
| C.2 | Check if any phrase from the NFR logging glossary is present in the input sentence. Tag as "Error Handling" | — | Described below |
| C.3 | If category is not (C.1 or C.2) and a phrase from NFR glossary is present in the input sentence. Tag as "NFR" | — | Described below |
| C.4 | Noun->action->noun Where either of the nouns are "people", Tag as "Input/Output" Else if both the nouns are "system nouns", | S-l-O S-MVp-J S-lx-Pa-TO-MVp-J S-l-MVs | FIG. 28, 2802 |
| C.5 | Noun->action->noun Where either of the nouns is a "person". If the "person noun" is connected to the "input" side of the verb, Tag as "Input test" | S-l-O S-MVp-J S-lx-Pa-TO-MVp-J S-l-MVs | FIG. 28, 2804 |
| C.6 | Noun->action->noun Where either of the nouns is a "person". If the "person noun" is connected to the "output" side of the verb, Tag as "Output test" | S-l-O S-MVp-J S-lx-Pa-TO-MVp-J S-l-MVs | FIG. 28, 2806 |
| C.7 | Check if the sentence has an if/then, when, | Cs | FIG. 29, 2902 |
| C.8 | Check if any of the phrases in the system 102 Conformance glossary is present in the input sentence. Tag as "Conformance" | — | FIG. 29, 2904 |
| C.9 | Check if any of the phrases in the system 102 Usability glossary is present in the input sentence. Tag as "Usability" | — | FIG. 29, 2904 |
| C.10 | No rules fire Tag as "Business Logic" | | |

TABLE 7

Example Categories

| Category Types | Example |
| --- | --- |
| Function (or Business Logic) test | User shall update the table to overwrite system default |
| Interface/Inter-module test | The user shall use a touch-screen kiosk to select options |
| Input domain test | The user must enter an 8 digit alphanumeric password NOT containing special character "!" |
| Usability/conformance | 75% of the portal content must be viewable in standard 1024*768 browser resolution without scrolling down |
| Output correctness | The system should emit "1" on successful exit |
| Condition/dependency test | The invoice is generated only after the shipment entry tag is processed. |
| Error handling | The exception should be captured and a user specific error code should be displayed |
| Security | For any secure browser sessions an inactivity and timeout condition must be set |
| NFR | The system should support 300 logged in users and 40 concurrent users |

For the security category, the system 102 may compare the requirement statement 1006 to the indicator phrases in the DARAs NFR glossary marked as security. For error handling, the system 102 may compare the requirement statement 1006 to the indicator phrases in the DARAs NFR glossary marked as "logging", "disaster recovery", "DisasterRecoveryRequirements", "Recovery Time", or any other phrases that indicate error handling.

As noted above, the non-functional requirement (NFR) statement specifies how a system should behave. What the behavior should be is captured in the functional requirement. The system 102 may compare the requirement statement 1006 to the indicator phrases in the DARAs NFR glossary, except those marked for security or error handling (as noted above).

The system 102 may categorize a requirement statement as involving an inter-module test as follows:

Noun→Modal Verb→{Preposition, condition}→Noun

Figure 28:
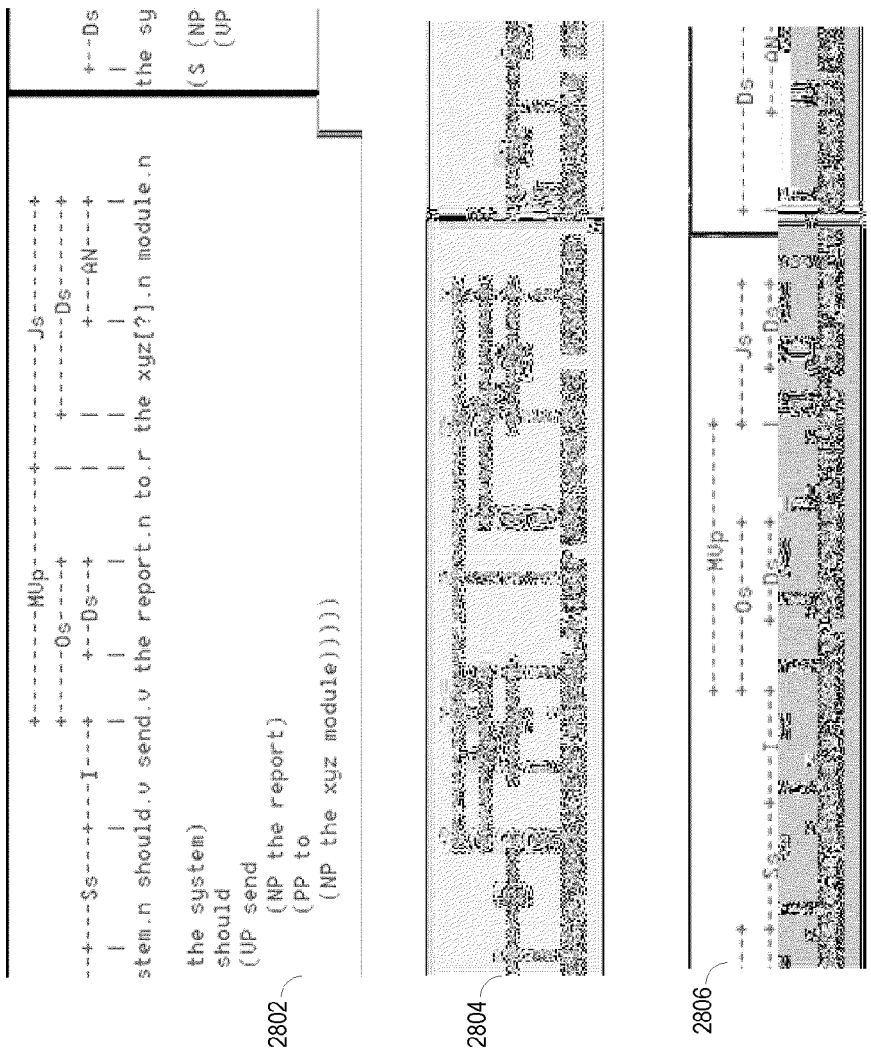
FIG. 28 illustrates examples of inter-module test and input/output domain requirement statements.

Then, the system 102 may confirm that both the nouns are not actors and not persons. An example inter-module test statement 2802 is shown in FIG. 28 for the requirement statement "The system should send the report to the xyz module."

The system 102 may classify verbs as input/output. For example, the system 102 may regard "send" and "click" as outputs and "receive" as an input. The system 102 may then determine whether a person noun phrase occurs to the left of the verb or to the right of the verb. If the person noun phrase is to the left, the system 102 may categorize the requirement statement as an "Input domain", else as an "Output domain." An example Input domain statement 2804 is present in FIG. 28. An example output domain statement 2806 is also present in FIG. 28.

Figure 29:
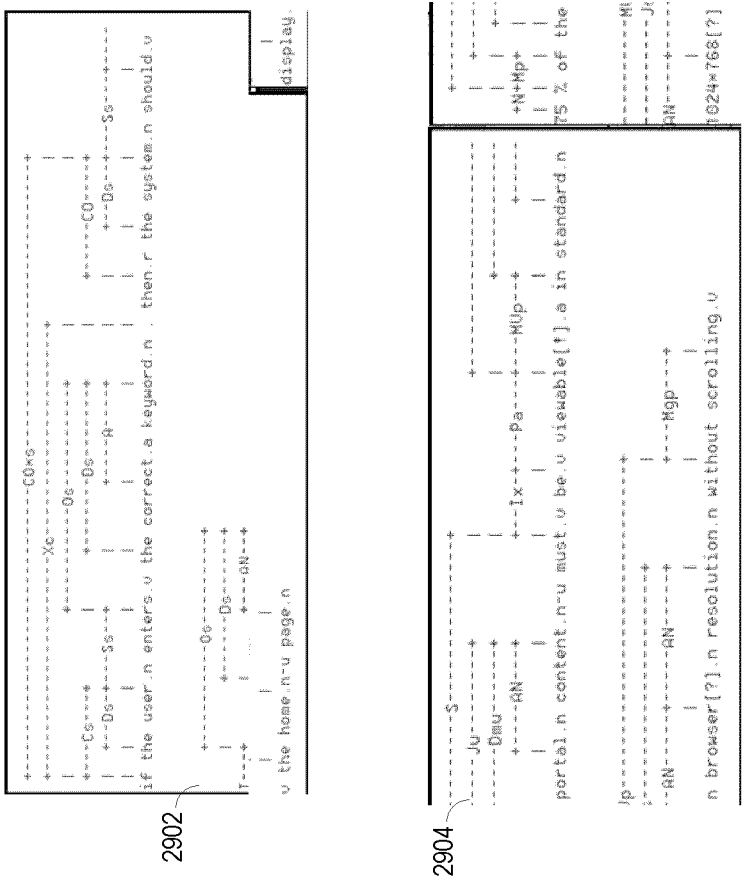
FIG. 29 illustrates examples of condition/dependency and usability/conformance requirement statements.

The system 102 may determine that a requirement statement is of the category Condition/Dependency, when the parser logic 1014 locates condition "C" structures in the requirement statement. An example Condition/Dependency statement 2902 is shown in FIG. 29.

The system 102 may determine that a requirement statement is of the category Usability/Conformance, when the parser logic 1014 locates any of the keywords in the usability glossary or in the conformance glossary, respectively, in the requirement statement. An example Usability/Conformance statement 2904 is shown in FIG. 29.

With regard to data test artifacts, the system 102 may proceed under the assumption that the preprocessor logic 1008 has executed whatever rulesets have been implemented (e.g., the preprocessor rulesets shown in Tables 1 and 2). For example, the system 102 may assume that the preprocessor logic 1008 has made the following replacements (and optionally other or different replacements defined in the preprocessor rulesets noted above) by the time that the system 102 analyzes the requirement statement for data test artifacts:

Replace "no later than" with "by";
Replace "no sooner than" with "after";
Replace "less than", "lesser than", "lower than", "fewer than" with "<";
Replace "as many as", "as much as", "up to", "at most", "some", "about", with <=;
Replace "more than", "greater than", "higher than", "further than", "just over", "well over", with >, and
Replace "at least" with >=.

If the parser logic 1014 output has Nlf & Nit, and either "between" or "from", then the system 102 may loop through the results until Nlr or threshold. Accordingly, the system 102 may ensure that it handles a range keyword, such as between and from, in the correct manner. The system 102 may, when the parser logic 1014 generates multiple linkages, select the linkage that facilitates further processing of the requirement statement (e.g., the linkage that facilitates a rule firing).

TABLE 8

Data Ruleset

| Rule ID | Rule | Rule in LG nomenclature | Meaning | Example |
| --- | --- | --- | --- | --- |
| D.1 | Identify all numerals | Pull out the abs number which has the suffix .# | All numerals will have a suffix of .# | Described below |
| D.1.1 | Identify unit for time numeral | If abs no. has an (ND+ link or (Nlf*or Nit*) –> ND+ link) and ND– connects to a word with a suffix of .ti; Then data unit = word with ND– and data type = time | Test Data = abs. no & unit Data Type = time | FIG. 30, 3002, 3006 |
| D.1.2 | Identify month | If abs no. has (TM+ or TM– link) or (Nlf*or Nit*)–>TM; data type = day. Month = the other end of the TM link. | | FIG. 30, 3008 and FIG. 31, 3102, 3104 |

TABLE 8-continued

Data Ruleset

| Rule ID | Rule | Rule in LG nomenclature | Meaning | Example |
|---|---|---|---|---|
| D.1.3 | Identify the year | If abs. no has TY− link, data type = year. Month = other end of TY link (TY+). Check the month is the same. Else log error and keep month as that pointed by TY+ | Test Data = day (abs no) + Month + year (abs no) Data type = Date | FIG. 30, 3008 and FIG. 31, 3102 |
| D.1.4 | Identify other units | If abs. no has ND+, Dmc+, Dmnc+ or AN, or (Nit* or Nlf*) −> ND+, Dmc+, Dmnc+ or AN the unit is that pointed by the other end of the link | Test Data = abs no. & unit Data Type = natural number | FIG. 32, 3202, 3204, 3206 |
| D.2 | Identify Boolean data | If the LG output has .#b data | | FIG. 34, 3402, 3404 |
| D.2.1 | Identify the units | Pull out the word with the subscript as .#b | Test Data = NP Data Type = Boolean | FIG. 34, 3402, 3404 |
| D.3 | Identify the condition by looking at the preposition before the numeral | For all .# data, check the SBAR or PP phrase before the tag containing the .# | | Described below |
| D.3.1 | Cases of lesser than | SBAR or PP = "before", | Test Condition - < | Described below |
| D.3.2 | Cases of greater than | SBAR or PP or VP = "after" | Test Condition - > | Described below |
| D.3.3 | Cases of lesser than and equal to | SBAR or PP = "by" | Test condition - <= | Described below |
| D.3.4 | Cases of greater than and equal to | SBAR or PP = "from" | Test Condition - >= | Described below |
| D.3.5 | Cases of equal to | SBAR or PP or VP = "on,", "to", "at", "but", "in", "be" | Test Condition - = | Described below |
| D.3.6 | Cases of symbols | If .# data has an EN link, pick up the symbol from EN+ | Test Condition - symbol from EN+ | Described below |
| D.4 | Conditions with a range | If the sentence has Nlr link, | Test Condition - < with the Nlf+ data Test Condition - > with the Nit− data * if the condition is between (the analysis logic 1018 may check the abs. nos. before putting < & > - eg: between 8 and 4 | Described below |
| D.5 | Print the test date | — | Data = {condition} {test data} Type = {data type} | |

Different kinds of test data may be present in a requirement statement. As examples, time data, date data, numeric data, and Boolean data may be present. The system 102 may recognize test data associated with a numeral, a unit, a condition (such as a relational symbol like <, >, =, <=, >=), a variable that takes values. Furthermore, the system 102 may recognize that a requirement statement includes multiple instances of test data, linked by conjunctions or a range, as examples. The system 102 may identify units of data by pulling out the immediate post nominal link from the identified data. Particular links may be analyzed for time and date. Similarly, the system 102 finds units when the data is in a range (e.g., The password should be between 8 and 10 characters). The system 102 may further identify the condition (such as a relational symbol like <, >, etc). To that end, the system 102 may identify the pronominal modifier to the data (e.g., The password should be less than 10 characters).

Figure 30:
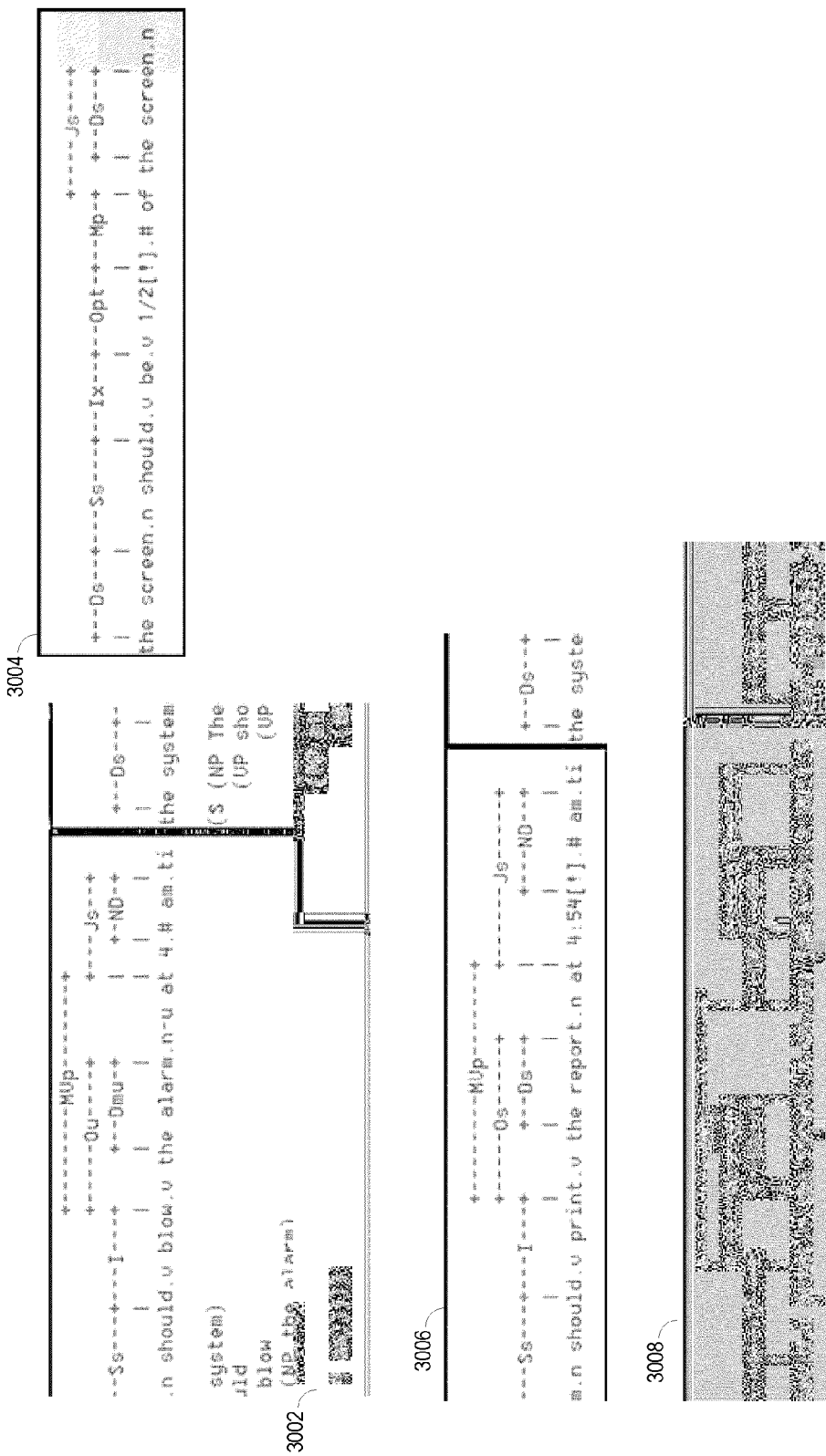
FIG. 30 illustrates examples of number and time data located in requirement statements.

With regard to numerals, the system 102 may recognize natural numbers, fractions, and decimals, time (e.g., 5:35), date (e.g., first, 1st). The parser logic 1014 may link numbers with a ".#" symbol. The system 102 may then identify numbers by searching the parser logic output for data tagged with a ".#". FIG. 30 shows an absolute number example 3002, a fraction example 3004, a time example 3006, and a date example 3008. The parser logic 1014 may include a dictionary that lists the various numerals and other parts of speech that may occur in an English sentence (e.g., 1, first 2011, and so on). The system 102 may employ a modified dictionary for the parser logic 1014 to supply a suffix of ".#" to each occurrence of such a numeral, similar to the way in which the parser logical may apply of suffix of ".v" to verbs, ".a" to adjectives, ".ti" to time or date.

The parser logic 1014 may output tags for time units that include a suffix of .ti→for am, pm, a.m., p.m., o'clock & o-clock, with the numeral connected with an ND link. The system 102 may pick up the numeral from the .# and look at the word reached from it through the ND link to find the numeral. If the word also includes a .ti suffix, the system 102 may conclude that the data is time data. In summary Unit=ND– word; Data type=time.

Date information may vary from concepts such as the "last day of the month" to "Midnight, noon, quarterly, weekly, monthly, fortnightly, daily, half-yearly, yearly, annually, p.a., p.m." to "equal installments" or "intervals", or other phrases. The system 102 may identify the day by the TM– or TM+ link and may identify the year by the TY– link.

The system 102 may determine that if the .# has a TM– or a TM+ link, the .# word is the day. The system 102 may then conclude that the word pointed by the complimentary of the TM is the month. Similarly, if the .# has a TY– link, it is the year. The TY+ link corresponding to this is the month. The month from the day & year should be the same. If they are different, the system 102 may log this condition as an error & choose the month from, for example, the TY+ structure. The system 102 may conclude that if .# is connected with a TM or TY, the data type is date.

Figure 31:
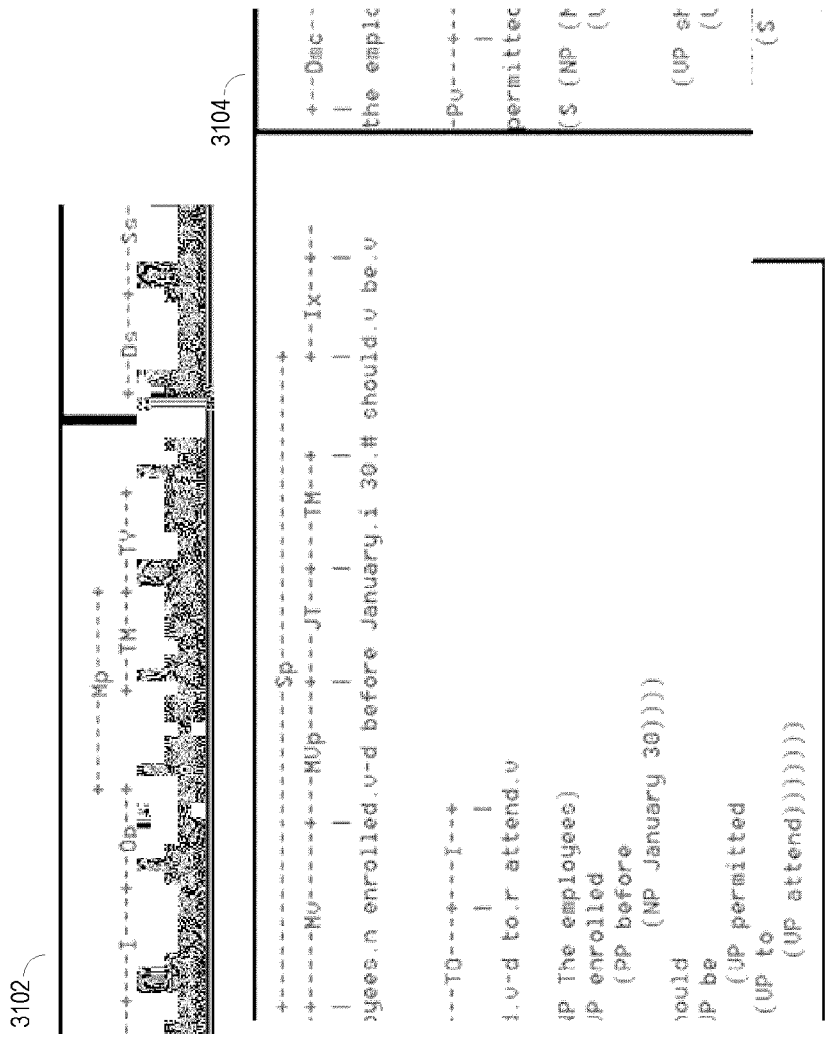
FIG. 31 illustrates examples of handling date data in requirement statements.

FIG. 31 shows a date example 3102 (Day: first, Month: January, Year: 2011, and Data Type: Date), as well as a date example 3104 (Day: 30, Month: January, Data Type: Date).

Figure 32:
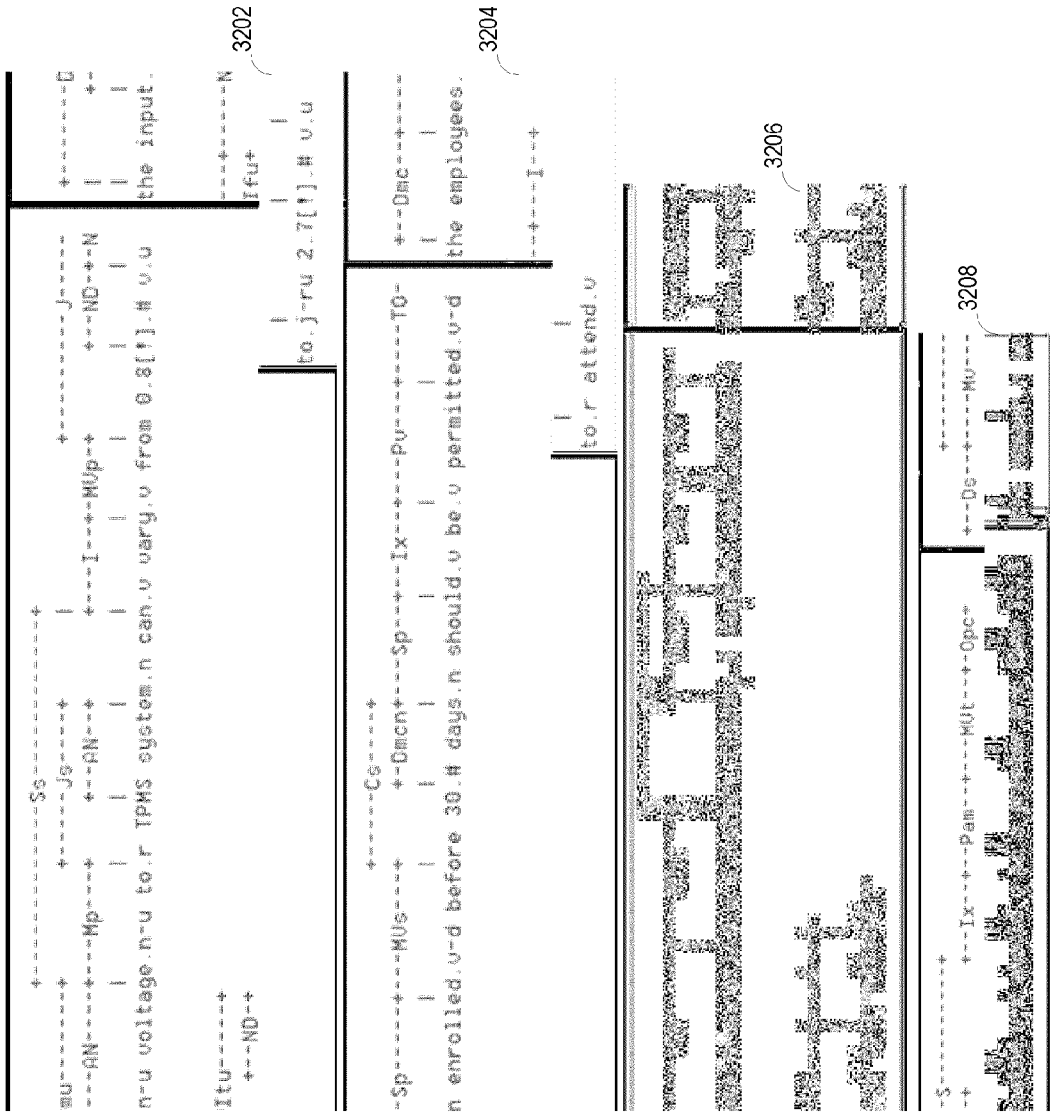
FIG. 32 illustrates examples of handling numeric data in requirement statements.

FIG. 32 shows a fractional number example 3202, "the input voltage to tpms system can vary from 0.8 v to 2.7 v" where the system 102 picks up the ND+ link. FIG. 32 also shows numeric examples 3204 and 3206 in which the system 102 captures numeric data through the Dmnc+ and Dmc+ links. In other situations, the system may mark the unit as "none", such as in the numeric example 3208.

Figure 33:
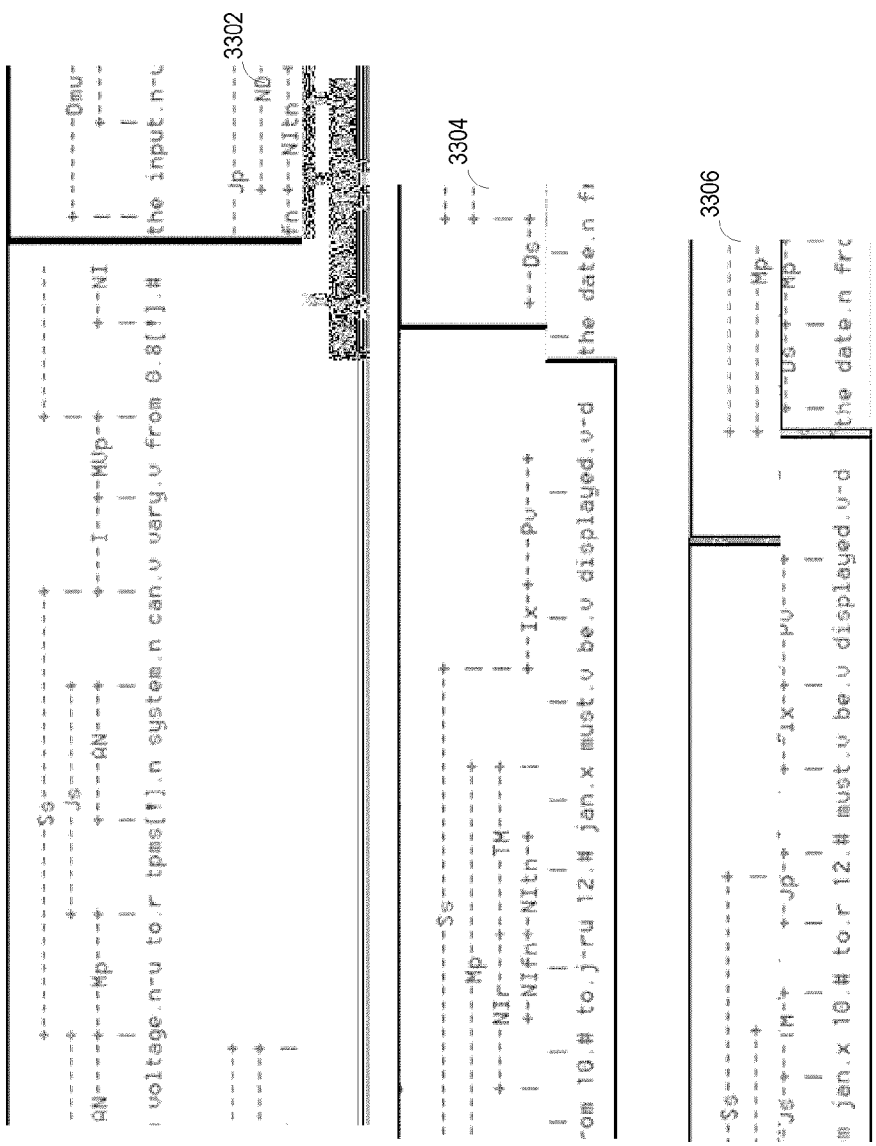
FIG. 33 illustrates examples of handling range data in requirement statements.

The system 102 may identify units with a range of data or multiple possible data values. FIG. 33 shows a range example 3302, and a range example 3304. For the range example 3302, the system 102 may determine that if the .# does not have an ND link, but has (Nlf* or Nit*)→ND, the unit is the ND– link. The system 102 may recognize as ambiguous a requirement statement with multiple dates with the month before the date, as shown in the ambiguous example 3306.

Regarding Boolean data, the system 102 may recognize, as examples, ON, OFF, TRUE, FALSE. These may be associated with the variable in the following examples:

If the switch is ON if the switch is in ON position

The system 102 may make each of these terms behave like a number and therefore act like an object. The parser logic 1014 may give them a suffix of .#b. The system 102 may increase the weight of Pa and Paf for True & False. This is because, when these occur, they would most likely be used in the Boolean context.

The system 102 need not modify weights for 'on', since 'on' will largely be used in two contexts—"switch on" & "on the table." In both these cases, 'on' cannot act like a number. Similarly, 'off' can be used in switched off mainly and again cannot act like a number here. In general, the parser logic 1014 may assign grammatical links in a manner that minimizes the number of links. However, in the context of requirements testing, certain links between words do not fit (e.g., "the switch should be in ON mode."). Here "ON" is to be used as a Boolean as opposed to a conjunction. The system 102 recognizes this by increasing the weight of the conjunction link of "ON", thus making the Boolean use of "ON" occur before the former.

Figure 34:
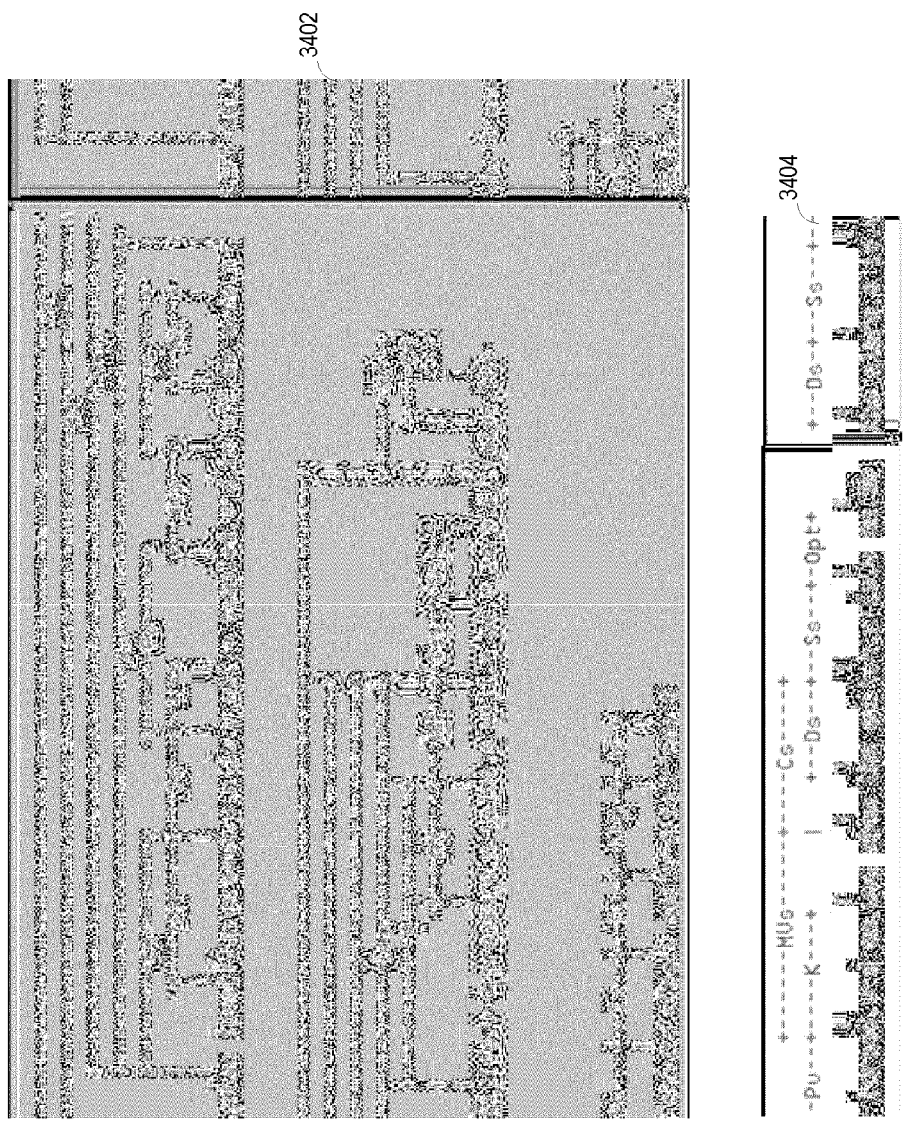
FIG. 34 illustrates examples of handling Boolean data in requirement statements.

FIG. 34 shows a Boolean example 3402 parsed by the parser logic 1014, "When tpms pressure is not sampled in off mode, the transmitted pressure value will be zero, else the value should be set to one." In this case, the system 102 recognizes that: Test data, tpms pressure=off mode (boolean); Transmitted pressure value=zero (numeric); Value=1 (numeric). Another boolean example 3404 is shown for the statement "The alarm is turned on only when the switch is in on position." (Test data: switch=on (Boolean)).

Note that the time & date can have the prepositions: at, on, for by, before, after, from, to; and phrases like no later than, no sooner than. For the system 102 to identify a condition, the system 102 may search for the (PP or SBAR) from the constituent tree before the NP of the data element.

If it is "by", "before", put "<"

if it is "after", "from", put ">"

else put "="

If the phrase is no later than, replace with "by" in the pre-processor

If the phrase is no sooner than, replace with "after" in the pre-processor

For example, "The employees enrolled before 30 January should be permitted to attend": Test Data:<30 January, Test Type: Time/Date.

In case of numeric data, the prepositions that occur are: equal to, less than, more than, greater than, lesser than, higher than, lower than, fewer than, further than, as many as, as much as, up to, at least, at most, be, at, all but, none but, within, in, The system 102 may analyze the <PP> phrase in the constituent tree:

To, at, but, in: =

In some cases, the system 102 may analyze different tags in the constituent tree:

Be: <VP>: =

"Less than" is generating the EN link as the next option. The system 102 may look for the next, however, the system 102 may replace these terms using the pre-processor logic 1008:

Less than, lesser than, lower than, fewer than, < as many as, as much as, up to, at most, within: <=

More than, greater than, higher than, further than, > at least,: >=

Figure 35:
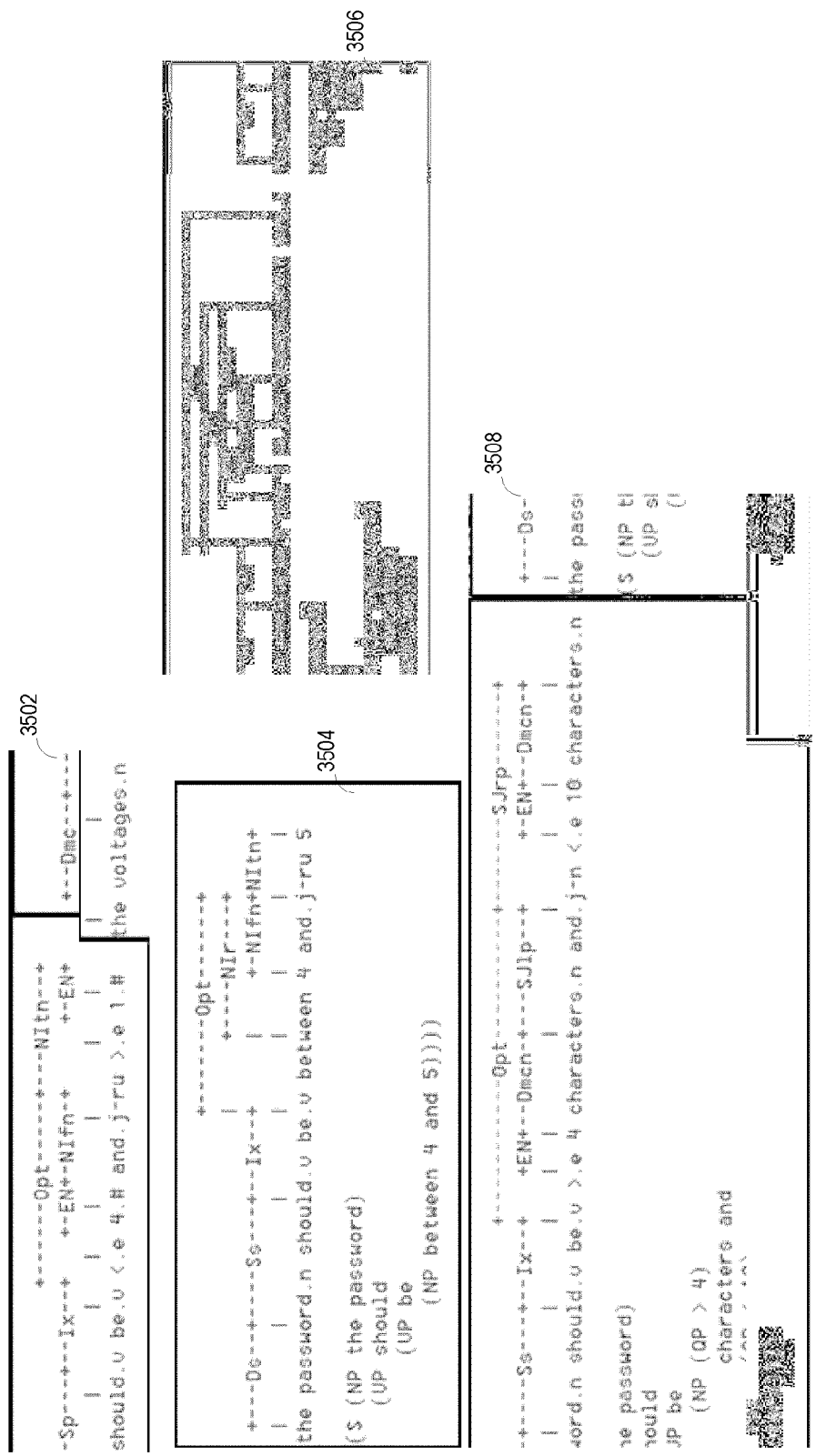
FIG. 35 illustrates examples of handling range data in requirement statements.

These are then picked by the EN link, as shown in the range example 3502 in FIG. 35.

Multiple conditions can occur through:

Ranges like (between, from to)→the system 102 finds these by searching for the Nlr structure.

and, or (Eg: less than 4 and greater than 5)

The system 102 finds ranges through the Nlr structure as shown, for example, in the range example 3504 shown in FIG. 35.

Words that can have ranges will have an Nlr+ link: between, from, and the system 102 may handle the Nlr structure as follows, <Nlf*+ and >Nit*–, as shown in the range example 3506. The range example 3508 shows how a statement with and/or may be parsed and recognized by the system 102.

The system 102 may analyze specific words in the requirement statement 1006 with reference to one or more glossaries. For example, the ambiguity glossary 1022 may store selected words as noted for example in Table 9 that when found by the system 102 in the requirement statement 1006 imply non-ambiguity for the phrase in which the words exist. As described in more detail below (e.g., and with respect to FIG. 11), the system 102 may perform the ambiguity tests after establishing the testability of the requirement statement and in parallel or in sequence with the application of other rulesets, including the intent, data, and categorization rulesets.

TABLE 9

Ambiguity Glossary—glossary for unambiguous terms, with respect to testability, used in conjunction with the ambiguity ruleset shown in Table 4.

| Link Type | Word Type | Words |
|---|---|---|
| Adjective | Rank Comparator | First, last, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, twenty-third, twenty-fourth, twenty-fifth, twenty-sixth, twenty-seventh, twenty-eighth, twenty-ninth, thirtieth, thirty-first, current, next, previous |
| Adjective | Mathematical and Statistical | accumulative, analytic, analytical, angular, arithmetical, asymmetric, asymmetrical, circular, concave, concentric, conic, conical, convex, cubic, cubical, cuboid, cuboid, cylindrical, diagonal, disjunct, double, equilateral, exponential, hexagonal, nonlinear, orthogonal, oval, parallel, polygonal, polyhedral, polynomial, probabilistic, quadrupedal, relational, round, single, square, tetrahedral, total, triangular, trigonal, trilateral, triple, absolute, accurate, average, binary, canonical, consecutive, decimal, hexadecimal, inaccurate, infinite, logarithmic, max, maximum, mean, median, medium, micro, mid, min, minimum, negative, nonzero, ordinal, polynomial, positive, positive, prime, random, rational, rational, real, zero, hundred, thousand, half-thousand, million, half-million, quarter-million, billion, half-billion, quarter-billion, trillion, half-trillion, quarter-trillion, dozen, half-dozen, bajillion, bazillion, gadzillion, gagillion, gajillion, gazillion, godzillion, jillion, jizillion, kabillion, kajillion, katrillion, killion, umptillion, zillion |
| Adjective | Technical | abstract, abstracted, accessible, agile, anonymous, archival, broadband, cellular, clean, columnar, commercial, compliant, conditional, constant, deadlocked, deterministic, dialup, digital, dimensional, dirty, dynamic, handheld, incremental, invalid, lazy, logical, lossless, lossy, multithreaded, multi-threaded, not null, null, online, persistent, plaintext, primitive, private, programmable, programmatic, public, secure, static, thick, thin, unique, valid, void, |
| Adjective | General | blank, bold, bolded, handwritten, italic, special, typewritten, academic, academical, accessible, All, alphabetic, alphabetical, automatic, autonomous, auxiliary, both, chief, chronological, compulsory, computable, computational, computerized, concrete, concurrent, conditional, constant, discrete, distinct, distinctive, double, empty, equal, equidistant, exact, excess, final, financial, finite, functional, handmade, hierarchical, horizontal, hour, hypothetical, identical, left, left-handed, lexical, linear, mandatory, manual, mathematical, metric, minute, numeric, numeric, numerical, numerical, onboard, onscreen, ontological, passive, perpendicular, radial, regional, regional, |

TABLE 9-continued

Ambiguity Glossary—glossary for unambiguous terms, with respect to testability, used in conjunction with the ambiguity ruleset shown in Table 4.

| Link Type | Word Type | Words |
|---|---|---|
|  |  | reusable, righthanded, right-handed, secret, successful, sufficient, tabbed, technical, technological, textual, topmost, unambiguous, unnumbered, unregistered, unregulated, unsuccessful, untested, untitled, visible, |
| Adjective | Colours | Black, blue, orange, red, green, pink, purple, gold, yellow, azure, brown, blond, gray, green, silver, white |
| Adjective | Languages | Arab, Arabian, British, Arabic, American, Cantonese, Congolese, Chinese, Danish, English, Finnish, french, French, German, Guyanese, hispanic, Irish, Italian, Japanese, Lebanese, Maltese, Polish, Portugese, Roman, Russian, Scottish, Senegalese, Spanish, Slavic, Sudanese, Surinamese, Swedish, Swiss, Taiwanese, Thai, Turkish, Vietnamese, |
| Adverbs |  | alphanumerically, anonymously, anticlockwise, clockwise, counterclockwise, diagonally, experimentally, exponentially, hierarchically, insecurely, lazily, legislatively, lengthways, lexically, locally, logarithmically, loosely, Only, orthogonally, previously, programmatically, quarterly, randomly, securely, serially, statically, successfully, successively, terminal, thrice, twice, unclassified, unsuccessfully, visually, |
| EN Adverbs |  | by, after, <, <=, >, >=, =, <>, !=, Only, just, exactly, all but, nothing_but, an_estimated, an_additional, as_much_as |

TABLE 10

Conformance Glossary

| | |
|---|---|
| Conformance | ICS |
| Conform to | HIPAA |
| Adhere to | CMI |
| Must follow | A4 |
| Oriented to | Policy |
| In orientation with | Style guide |
| In accordance to | ANSI |
| Browser | FCC |
| Browsers | IEC |
| Internet Explorer | IETF |
| Chrome | Protocol |
| Firefox | SIP |
| Safari | ASN* |
| Compliant with | ITU |
| Comply with | TCP |
| compliance | IP |
| Standard | GSM |
| IEEE | ISDN |
| W3C | OMA |
| ETS | TOGAF |
| ISO | UML |
| IEC | OASIS |
|  | COTS |
|  | RUP |
|  | Law |
|  | Legal |
|  | Format |
|  | Formatted |
|  | HIPAA |
|  | SOX |
|  | Basel |
|  | UTF* |
|  | Validation/validity |

TABLE 11

Usability Glossary

| | |
|---|---|
| Usability | UI |
| useful | GUI |
| Resolution | Graphic |
| Scroll | Right approach |
| Location | Time to learn |
| environment | Less interference |
| Look and feel | No interference |
| Ease | Satisfaction |
| Easy | Satisfactory |
| Appeal | Acceptable |
| attract | Effective |
| Difficult | Internationalization |
| Readable | i18n |
| legible | Localization |
| Display | L10n |
| Look at | Locale |
| Distortion | Accessibility |
| distorted | Navigation |
| Brightness |  |
| Color |  |
| Contrast |  |
| Pixels |  |
| Bandwidth |  |
| Size |  |
| Height |  |
| width |  |
| Font |  |
| Picture |  |
| Language |  |

TABLE 12

NFR Glossary

| Area | System Attribute | Indicator_Phrases |
|---|---|---|
| Delivery Channels | Delivery channels | Delivery channel, delivery channels, environment, environments, Browser, browsers, PDA, printed report, report, reports, reporting, Internet Explorer, Mozilla, Safari, Netscape, Firefox, iPhone, windows mobile, black berry, palm, mobile phone, smart phone, fax, facsimile, android, RSS, twitter, pdf, Word, Excel, cellphone, screen monitor, LCD, CRT, Americans with Disabilities Act, ADA, screens, display screen, screen dimension, screen resolution, VGA, hidef, high-def, HD, high definition, GUI, UI, query, querying, web service, web services, XML, Ajax, sd card, letter, email, emails, e-mail, e-mails, text message, SMS, WAP, web application, web app, desktop application, goggle app, facebook app |
| Delivery Channels | Connectivity Requirement | Dial-up, dial, broadband, dsl, internet, web, intranet, leased line, LAN, WLAN, 3G, Edge, 4G, wifi, wi-fi, landline, fiber, twisted pair, https, CDMA, GSM, wimax, Bluetooth, Ethernet, dix, WAP, satellite, cat5, cat6, fibre, coaxial, coax |
| CapacityVolumetrics | Locations | User located, user location, processing location, location, locations, inside firewall, onsite, offsite, onshore, offshore, local, nationwide, worldwide |
| CapacityVolumetrics | Number Of Users | User count, users, average, max, maximum, over, peak, total |
| CapacityVolumetrics | Concurrent Users | Logged-in, logged, connections, Concurrent Users, concurrent sessions, average, max, maximum, over, peak, total |
| CapacityVolumetrics | Transaction Mode | Online, asynchronous, transaction, processing, async, interactive, transaction, batch mode, batch process, batch processing, spring batch, scheduling, batch cycle, batch function, batch scheduler, batch job, batch-queuing, batch queuing, batch queue, queue |
| CapacityVolumetrics | UseCaseExecution Rate | Use case execution, Per minute, per hour, per second, per sec, per seconds, average, maximum, peak |
| CapacityVolumetrics | ServerTransactionPerUseCase | Transaction, Transactions, server, Hits, http requests, transactions, process hits, web service requests, average, max, maximum, over, peak, total |
| CapacityVolumetrics | TransactionRate | Transaction rate, Per minute, per hour, per second, per sec, per seconds, average, maximum, peak |
| CapacityVolumetrics | TransactionSize | Transaction, data exchange, data transfer, data interface, upload, download, average, byte, Bytes, kilobyte, kilobytes, megabytes, megabyte, gigabytes, terabytes, pentabytes, kb, MB, GB, TB, average number of bytes |
| CapacityVolumetrics | DataVolumes | data storage, database, relational database, record Records, byte, Bytes, kilobyte, kilobytes, megabytes, megabyte, gigabytes, terabytes, pentabytes, kb, MB, GB, TB, average number of bytes |
| CapacityVolumetrics | DataRetentionReq | Purge, retention, data retention policy, retain, email retention, record retention, 7-years, privacy, seven, data, retain, account retention, years online, years in archive, business records, data deletion, delete, discovery request, information retention, discovery cost, archiving, backup, database, relational database |

TABLE 12-continued

NFR Glossary

| Area | System Attribute | Indicator_Phrases |
|---|---|---|
| Performance | TotalExpectedExecutionTimePerUseCase | complete processing, return a response, execution time, executed, finished, finish, millisecond, milliseconds, ms, Seconds, second, sec, minute, minutes, mins, hour, hours, hr, hrs, use case |
| Performance | AverageUserThinkTimePerTransaction | complete processing, return a response, execution time, executed, finished, finish, millisecond, milliseconds, ms, Seconds, second, sec, minute, minutes, mins, hour, hours, hr, hrs, use case |
| Performance | Concurrent Transactions | Concurrent transaction, simultaneously, simultaneous, combined, synchronous, wait, waiting, queue, average, max, maximum, over, peak, total, connections, concurrent sessions, at the same time |
| Performance | Response Time | Response time, response times, respond, average response time, 95th percentile, millisecond, milliseconds, ms, Seconds, second, sec, minute, minutes, mins, hour, hours, hr, hrs |
| Performance | BatchCycle | batch mode, batch process, batch processing, spring batch, scheduling, batch cycle, batch function, batch scheduler, batch job, batch-queuing, batch queuing, batch queue, queue |
| Performance | BatchProcessingWindow | AM, PM, weekend, weekends, weekday, weekday, workday, Monday, Tuesday, Wednesday, Thursday, Friday, Saturday, Sunday, between, time, batch mode, batch process, batch processing, spring batch, scheduling, batch cycle, batch function, batch scheduler, batch job, batch-queuing, batch queuing, batch queue, queue |
| Performance | Batch Execution Time | Maximum execution time, complete processing, return a response, execution time, executed, finished, finish, millisecond, milliseconds, ms, Seconds, second, sec, minute, minutes, mins, hour, hours, hr, hrs, batch mode, batch process, batch processing, spring batch, scheduling, batch cycle, batch function, batch scheduler, batch job, batch-queuing, batch queuing, batch queue, queue, average, max, maximum, over, peak, total |
| Performance | Batch dependencies | Start, finish, before, dependent, depends, batch mode, batch process, batch processing, spring batch, scheduling, batch cycle, batch function, batch scheduler, batch job, batch-queuing, batch queuing, batch queue, queue |
| Scalability | Scale | Scalable, machines, increase load, increases, grow, growth, scale up, readily enlarged, performance, enlarge, enlarged, augment, increment, transaction volume, transaction volumes, data growth, expand capacity, expanded, expanding, increased number, increased amount |
| Availability | Hours of operation | Operation, operate, 7-days, seven days, 24x7 24/7, AM, PM, 24-hours, 24-hr, 24-hrs, weekend, weekday, workday, 365, AM, PM, weekend, weekends, weekday, weekday, workday, Monday, Tuesday, Wednesday, Thursday, Friday, Saturday, Sunday |
| Availability | Scheduled Maintenance | Down maintenance, Scheduled Maintenance, Operation, operate, AM, PM, weekend, weekends, weekday, weekday, workday, Monday, Tuesday, Wednesday, Thursday, Friday, Saturday, Sunday |
| Availability | Percent Availability | Availability percentage, %, percent, outage duration, five nines, available, 99.9, 99.99, 99.999, uptime, high availability, SLA |

TABLE 12-continued

NFR Glossary

| Area | System Attribute | Indicator_Phrases |
|---|---|---|
| Availability | Recovery Time | Recover, heart beat ping, detect failure, failover, second, seconds, minute, minutes, hour, hours, average, maximum, failure detection, unavailability, outage, outages, downtime, system failure, network outage, average, max, maximum, over, peak, total, millisecond, milliseconds, ms, Seconds, second, sec, minute, minutes, mins, hour, hours, hr, hrs |
| Availability | DisasterRecoveryRequirements | Disaster recovery, disaster recovery plan, natural disaster, catastrophic, catastrophe, outage, unavailability, earthquake, sabotage, DOS, DDOS, failover, service degradation, critical business function, business continuity planning, business impact analysis, recovery time objective, recovery point objective, cyber attack, utility outage, terrorism, emergency management |
| Security | Information Security | access rights, access, level access, LDAP, microsoft domain authentication, authentication, data transfer, VPN, DNS, private data, integrity, confidential |
| Security | Security Roles | privileged, standard role, access rights |
| Security | Security Administration | access request, grant access, request access, transfer access, terminate access, password policy, account disable, change password |
| Security | Access Review | |
| Security | Security Audit Trail | security audit, transaction audit |
| Security | Security Monitoring | |
| Security | Data Classification | |
| Security | Encryption | encrypt, encryption, cryptograph, cryptographic, unencrypted, digital signature, ciphertext, encipher, decryption, cipher, DES, AES, RSA |
| Security | Operation Security | |
| Security | Customer Privacy | |
| Support Requirement | Archive | archive, log, recovery |
| Support Requirement | Backup | backup, log recovery |
| Support Requirement | Purging | purge, purging |
| Support Requirement | Logging | log, logging, exception, recovery |
| Support Requirement | Monitoring | monitor, monitoring, notification, frequency, dashboard, |
| Support Requirement | Disaster recovery | disaster, recovery, |

Figure 11:
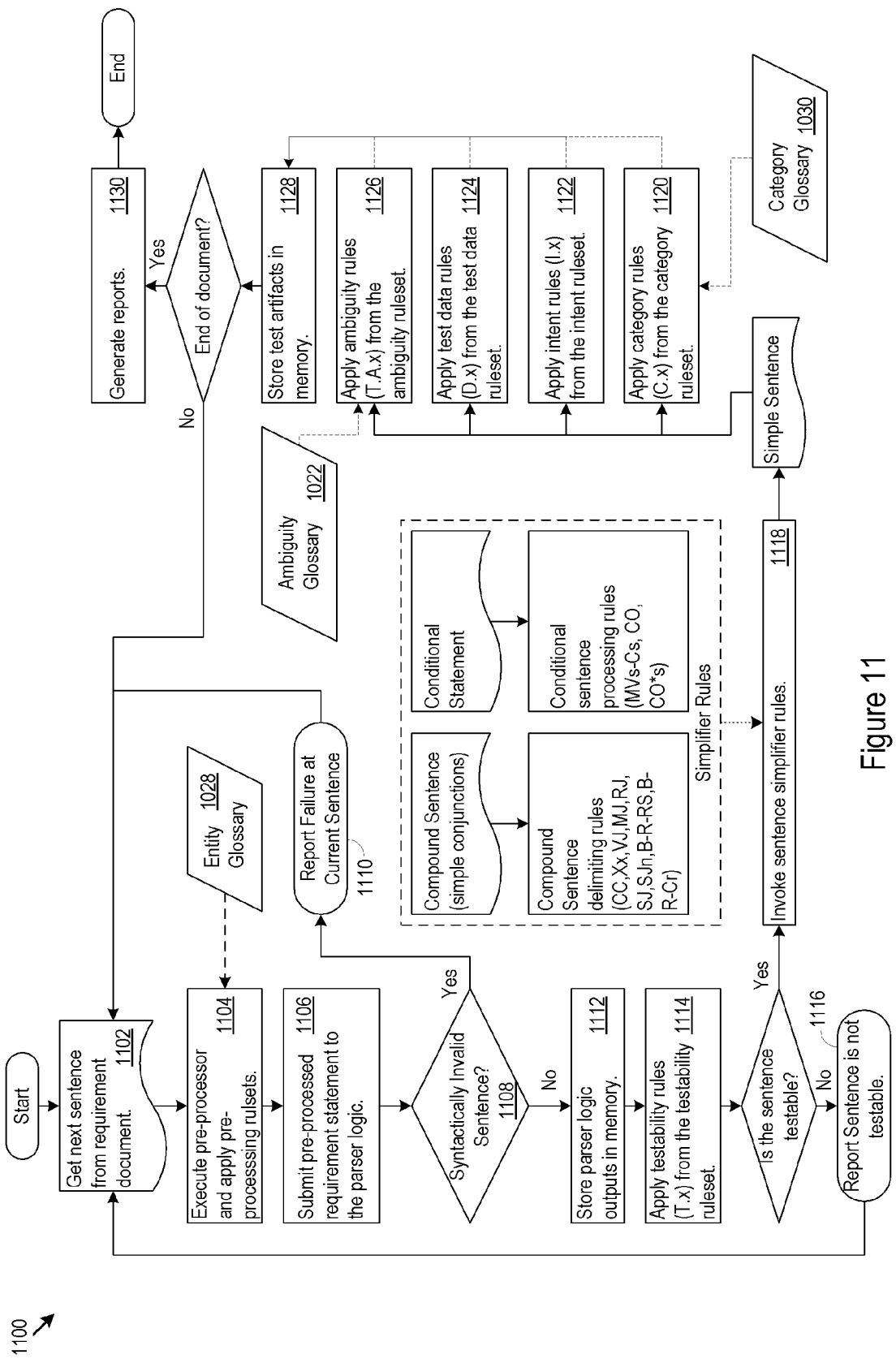
FIG. 11 shows a flow diagram of requirement testing logic that the requirements testing system may execute.
Figure 15:
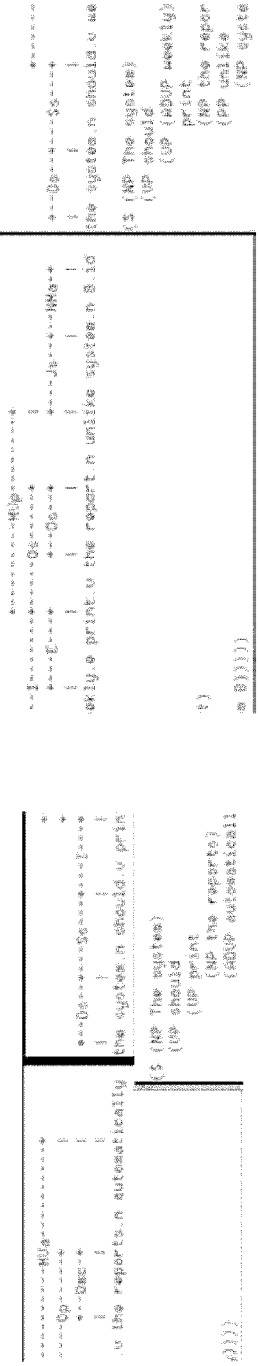

FIG. 11 shows a flow diagram of requirement testing logic 1100 that the requirements testing system 102 may execute. Portions of the requirement testing logic 1100 may be implemented in and distributed in any manner, e.g., in the pre-processor 1008, parser logic 1014, analysis logic 1018, or other logic in the system 102. The system 102 receives a requirement statement (1102), e.g., locally input, or remotely submitted through the network 110. The system 102 executes the pre-processor logic 1008 (1104). The pre-processor logic 1008 applies rulesets (e.g., rulesets 1010 and 1012) to initially condition the requirement statement. The pre-processing logic 1008 may also reference the entity glossary 1028 during operation to initially parse the requirement statement. In particular, the pre-processing logic 1008 may use the entity glossary 1028 to identify noun phrases where present and handle the missing determiner case noted above.

The system 102 submits the pre-processed requirement statement to the parser logic 1014 (1106). When the parser logic 1014 determines that the requirement statement is syntactically invalid (1108), then the system 102 may report that the requirement statement is invalid (1110) and continue analyzing additional requirement statements.

Otherwise, the parser logic outputs, such as the grammatical links, constituent tree, and the classification of words into the parts of speech are saved in the memory 1004 (1112). The analysis logic 1018 may then perform any desired analyses on the requirement statement by applying analysis rulesets to the requirement statement with reference to the parser logic outputs. For example, the analysis logic 1018 may apply a testability ruleset to determine whether any of the testability rules fire and the requirement statement is testable (1114). If the requirement statement is not testable, then the system 102 may report that the requirement statement is not testable (1116) continue on to other requirement statements for analysis.

The analysis logic 1018 may then invoke statement simplifier rules (1118). Examples of such rules include analysis and delimiting of compound sentences, and processing of conditional statements. The statement simplifier rules are explained in more detail above in the Compound Sentences ruleset with respect to the C, CC, B, VJ, and MJ rules. Given a resulting simplified sentence, the analysis logic 1018 may apply any other desired rulesets, such as the ambiguity ruleset (1126), the intent ruleset (1122), the category ruleset (1120), or the data ruleset (1124) to determine any desired test artifacts for the requirement statement. Each resulting simplified sentence may include the modal verb of the compound sentence from which it is derived. Simplifying a compound sentence and applying the rulesets to simple sentences derived from the compound sentence may resolve ambiguity in the compound sentence and improve the accuracy and utility of test artifacts. The analysis logic 1018 may store the determined test artifacts in memory (1128). A reporting module running in the system 102 may then read the test artifact results and generate and display an analysis report 116 (1130).

Figure 36:
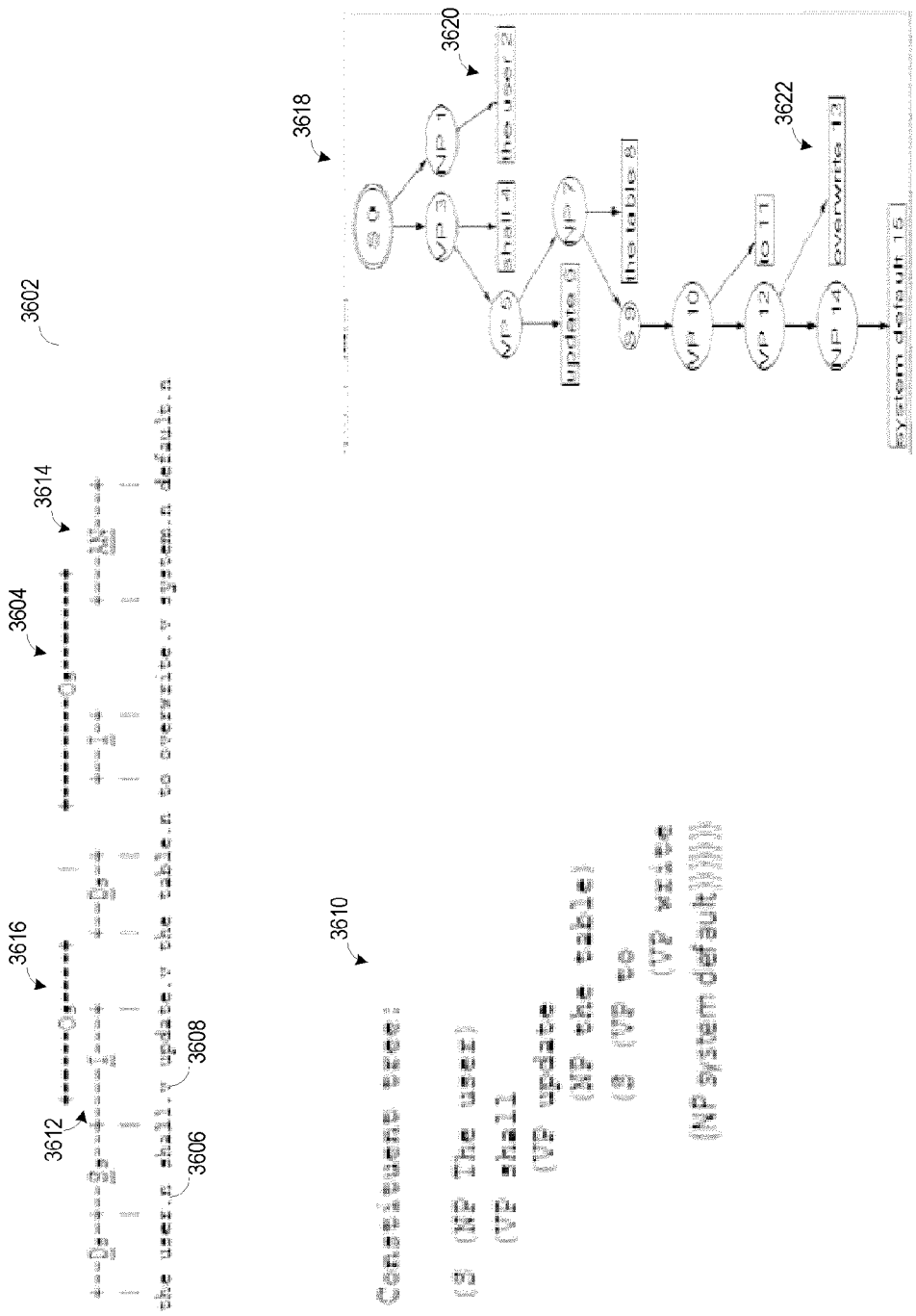
FIG. 36 shows an example of a requirement statement parsed into a constituent tree.

FIGS. 12-39 show many examples of parsed requirement statements. With reference to FIG. 36, an example generally applicable to the above noted figures is explained for the requirement statement 3602: "The user shall update the table to overwrite system default." The parser logic 1014 has parsed the requirement statement 3602 into grammatical links 3604, parts of speech (e.g., the noun "user" 3606 and the verb "shall" 3608), and the constituent tree 3610. As examples, the grammatical links 3604 include an "I" link 3612 between "shall" and "update," that connects an infinitive verb form to words including modal verbs and to "to"; an "AN" link 3614, that connects noun modifiers to subsequent nouns; and a "O" link 3616, that connects transitive verbs to direct or indirect objects.

The constituent tree 3610 shows how the requirement statement 3602 is composed by individual grammatical units. The graphical representation 3618 of the constituent tree also shows how the requirement statement 3602 flows through its component noun phrases (NP) (e.g., the noun phrase 3620: "the user") and verb phrases (VP) (e.g., the verb phrase 3622: "overwrite"). The constituent tree also identifies the subject (in this case "The user"). The numbers next to each node give a unique identifier for each node.

Figure 37:
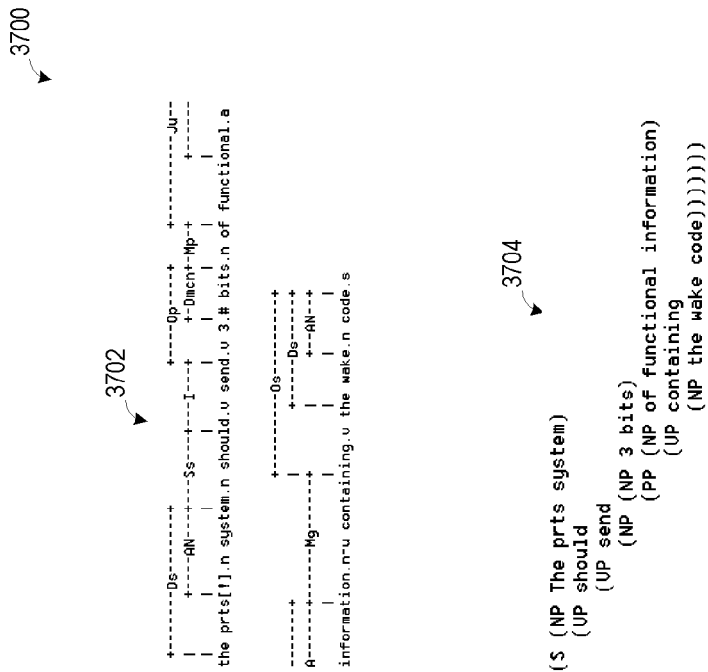
FIG. 37 shows an example of a requirement statement parsed into links and a constituent tree.

A specific example of the test artifacts that the system 102 generates is now given for the sentence "The PRTS system should send 3 bits of functional information containing the WAKE code." FIG. 37 shows the resulting parse 3700 by the parser logic 1014 into links 3702 and a constituent tree 3704. For this sentence, the following rules fire and the system 102 outputs the following test artifacts shown in Table 13:

TABLE 13

| Rule | Artifact |
|---|---|
| Testability Rule: T.1, S-l-O | Testable: Yes |
| Ambiguity Rule: T.A.1 - A | Functional |
| Ambiguity Rule: T.A.1.1 | Not Ambiguous |
| Intent Rule: I.1 - S-l-O | Template with words from constituent tree: |
| | Verify the PRTS system is able to send 3 bits |
| Intent Rule I.1.2 - NP-Mp | Template with words from constituent tree: |
| | Verify 3 bits Is of Functional information |

TABLE 13-continued

| Rule | Artifact |
|---|---|
| Intent Rule I.1.2 - NP-Mg | Template with words from constituent tree: |
| | Verify functional information Is Containing WAKE code. |
| Category Rule C.10 - None | Business Logic |
| Data Rule D.1. - .# | Data: 3 |
| Data Rule D.1.4 - D | Unit: bits |
| Data Rule D.5 | Test Data: = 3 bits |

The system 102 provides a framework for identification and analysis for early testing artifacts from natural language requirements. For any software project and in particular for large-sized software implementation projects, it is critical to identify and analyze if the functional requirement specifications, written in natural language (e.g., the English language), are testable in terms of business and user acceptance criteria. For example, a business analyst, test architect, or other personnel may benefit from knowing whether a functional requirement is un-ambiguously testable, what would be the intents of such tests (e.g., what functional/non-functional needs would those requirements be tested for), what category of test would the requirement belong to, and if there are any test data embedded in the requirement. These are significant test artifacts to identify and understand because in absence of such an exercise early in the test analysis and design phase, many ambiguous requirements may propagate downstream.

This gives rise to improper, ambiguous, or un-defined test specifications. Test case generation and test coverage may suffer as well. Also, from such imprecise test specifications, one cannot prepare a valid testing plan and estimate the testing effort required, and determine whether the functional coverage will be adequately achieved through testing. Although test cases can be generated automatically from properly specified and elaborate requirements and models, the activity of testability checking and generation of early testing artifacts from high-level functional requirements has been in the past mainly manual, subjective and error-prone. In contrast, the system 102 provides a novel automated framework for identification and analysis for early testing artifacts from functional requirement sentences. The framework leverages natural language processing techniques to obtain structural dependencies in the sentence (e.g., a requirement statement) and parts-of-speech phrase tagging. The system 102 employs a set of pattern matching rules to identify syntactic structure(s) of possible test intents, and a set of entity/keyword mapping rules to identify and tag test category and data from the phrases and mark ambiguity, if any.

Requirements testing systems and methods may be used for testing a requirement statement. Requirements testing systems may gather and analyze sentences to determine if the sentence is testable, invoke sentence simplifier rules to simplify the sentence, and extract test artifacts about the sentence. For example, in gathering and analyzing sentences to determine testability, some systems may execute pre-processing rulesets on the gathered sentences. The pre-processed sentences may be submitted to a parser logic which may be used to determine if the sentence is valid. Where the sentence is valid, the outputs from the parser logic may be stored and a testability ruleset may be applied to the sentence. Where the sentence is testable, the simplifier rules, such as compound sentence rules and conditional statement rules, may be applied to the sentence to simplify the sentence. Then, the various test artifact rules, such as ambiguity rules, test data rules, intent rules, and/or category rules may be applied to the sentence. The test artifacts obtained from the application of these rules may be stored. Such test artifacts may be used in reports or other analysis or processing as discussed.

In some requirements testing systems and methods, a requirement statement is obtained and stored in a memory. The requirement statement is submitted to a grammatical parser executed by a processor to obtain parser outputs characterizing the requirement statement. A test artifact ruleset is applied with the processor to the parser outputs to determine a test artifact applicable to the requirement statement.

These and other requirements testing systems and methods allow for developers to check for testability and various features of statements and documents. Another benefit of the requirements testing system is that it facilitates creation of test artifacts from requirement statements. The test artifacts reduce testing cycle time, effort, and expense, and improve test quality. As a result, the resulting software application is more reliable, less expensive, and is more timely delivered. This allows developers to implement complex statements and documents in less time and with fewer mistakes or ambiguities, increasing efficiency and effectiveness of the requirements statements. Requirements testing systems also result in various other advantages and effects.

The methods, systems, and logic described above may be implemented in many different ways in many different combinations of hardware, software or both hardware and software. For example, the logic executed by the system 102 may be circuitry in a controller, a microprocessor, or an application specific integrated circuit (ASIC), or may be implemented with discrete logic, or a combination of other types of circuitry. The logic may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for example, instructions for execution by a processor, controller, or other processing device. Similarly, the memory in the system may be volatile memory, such as Dynamic Random Access Memory (DRAM) or Static Random Access Memory (SRAM), or non-volatile memory such as NAND Flash or other types of non-volatile memory, or may be combinations of different types of volatile and non-volatile memory. When instructions implement the logic, the instructions may be part of a single program, separate programs, implemented in an application programming interface (API), in libraries such as Dynamic Link Libraries (DLLs), or distributed across multiple memories and processors. The system 102 may test input sentences other than requirement statements.

While various embodiments have been described, it will be apparent to those of ordinary skill in the art that many more embodiments and implementations are possible. For example, a method for testing a requirement statement may be provided. The method may include obtaining a requirement statement and storing the requirement statement in a memory. The method may further include submitting the requirement statement to a grammatical parser executed by a processor to obtain parser outputs characterizing the requirement statement. The method may further include applying a test artifact ruleset with the processor to the parser outputs to determine a test artifact applicable to the requirement statement.

In some cases, applying the test artifact ruleset includes applying a testability ruleset with the processor to the parser outputs to determine a test artifact that indicates whether the requirement statement is testable. Additionally or alternatively, it may be that applying the test artifact ruleset includes applying an ambiguity ruleset with the processor to the parser outputs to determine a test artifact that indicates whether the requirement statement is ambiguous with respect to testability. Additionally or alternatively, applying the test artifact ruleset may include applying an intent ruleset with the processor to the parser outputs to determine a test artifact that indicates an intent characteristic of the requirement statement. Additionally or alternatively, applying the test artifact ruleset may include applying a category ruleset with the processor to the parser outputs to determine a test artifact that indicates a category characteristic of the requirement statement. Additionally or alternatively, applying the test artifact ruleset may include applying a data ruleset with the processor to the parser outputs to determine a test artifact that indicates a data characteristic of the requirement statement. Additionally or alternatively, the method may further include executing a pre-processor on the requirement statement prior to submitting the requirement statement to the grammatical parser.

According to another aspect, a computer program product including computer-readable instructions may be provided. The instructions, when loaded and executed on a computer system, may cause the computer system to perform operations according to the steps (aspect and/or embodiments) discussed above.

According to yet another aspect, a requirement statement analysis system may be provided. The system may include a processor and a memory in communication with the processor. The memory may include a requirement statement and grammatical parser logic. The memory may further include analysis logic operable to, when executed by the processor obtain the requirement statement and store the requirement statement in the memory. When executed, the analysis logic may be further operable to submit the requirement statement to the grammatical parser logic and obtain parser outputs characterizing the requirement statement. The analysis logic may be further operable to apply a test artifact ruleset to the parser outputs to determine a test artifact applicable to the requirement statement.

In some cases the test artifact ruleset may include a testability ruleset configured to determine, as the test artifact, whether the requirement statement is testable. Additionally or alternatively, the test artifact ruleset may include an ambiguity ruleset configured to determine, as the test artifact, whether the requirement statement is ambiguous with regard to testability. Additionally or alternatively, the test artifact ruleset may include an intent ruleset configured to determine, as the test artifact, an intent characteristic of the requirement statement. Additionally or alternatively, the test artifact ruleset may include a category ruleset configured to determine, as the test artifact, a category characteristic of the requirement statement. Additionally or alternatively, the test artifact ruleset may include a data ruleset with the processor to the parser outputs to determine a test artifact that indicates a data characteristic of the requirement statement. Also, the analysis logic may be further operable to execute a pre-processor on the requirement statement prior to submitting the requirement statement to the grammatical parser.

It should be understood that various modifications to the disclosed examples and embodiments may be made. In particular, elements of one example may be combined and used in other examples to form new examples. Accordingly, the implementations are not to be restricted except in light of the attached claims and their equivalents.

What is claimed is:

1. A method for testing a requirement statement, the method comprising:
   obtaining a requirement statement and storing the requirement statement in a memory;
   submitting the requirement statement to a grammatical parser executed by a processor to obtain parser outputs characterizing the requirement statement;
   applying a test artifact ruleset with the processor to the parser outputs to determine a test artifact applicable to the requirement statement;
   determining whether the test artifact is testable; and
   after determining the test artifact is testable, simplifying the parser outputs in order for determining the test artifact to be a desired test artifact for the requirement statement.

2. The method of claim 1, where applying comprises:
   applying an ambiguity ruleset with the processor to the parser outputs to determine a test artifact that indicates whether the requirement statement is ambiguous with respect to testability.

3. The method of claim 1, where applying comprises:
   applying an intent ruleset with the processor to the parser outputs to determine a test artifact that indicates an intent characteristic of the requirement statement.

4. The method of claim 1, where applying comprises:
   applying a category ruleset with the processor to the parser outputs to determine a test artifact that indicates a category characteristic of the requirement statement.

5. The method of claim 1, where applying comprises:
   applying a data ruleset with the processor to the parser outputs to determine a test artifact that indicates a data characteristic of the requirement statement.

6. The method of claim 1, further comprising: executing a pre-processor on the requirement statement prior to submitting the requirement statement to the grammatical parser.

7. The method of claim 1, wherein simplifying comprises: invoking a statement simplifier rule.

8. The method of claim 7, wherein invoking comprises: delimiting a compound sentence.

9. The method of claim 7, wherein invoking comprises: processing a conditional statement.

10. A requirement statement analysis system comprising:
    a processor; and
    a memory in communication with the processor, the memory comprising:
      a requirement statement;
      grammatical parser logic; and
      analysis logic operable to, when executed by the processor:
        obtain the requirement statement and store the requirement statement in the memory;
        submit the requirement statement to the grammatical parser logic and obtain parser outputs characterizing the requirement statement;
        apply a test artifact ruleset to the parser outputs to determine a test artifact applicable to the requirement statement;
        determine whether the test artifact is testable; and
        after determining the test artifact is testable, simplify the parser outputs in order to determine the test artifact to be a desired test artifact for the requirement statement.

11. The analysis system of claim 10, where the test artifact ruleset comprises:
    an ambiguity ruleset configured to determine, as the test artifact, whether the requirement statement is ambiguous with regard to testability.

12. The analysis system of claim 10, where the test artifact ruleset comprises:
    an intent ruleset configured to determine, as the test artifact, an intent characteristic of the requirement statement.

13. The analysis system of claim 10, where the test artifact ruleset comprises:
    a category ruleset configured to determine, as the test artifact, a category characteristic of the requirement statement.

14. The analysis system of claim 10, where the test artifact ruleset comprises:
    a data ruleset with the processor to the parser outputs to determine a test artifact that indicates a data characteristic of the requirement statement.

15. The analysis system of claim 10, where the analysis logic is further operable to execute a pre-processor on the requirement statement prior to submitting the requirement statement to the grammatical parser.

16. The analysis system of claim 10, wherein the analysis logic to simplify is further operable to: invoke a statement simplifier rule.

17. The analysis system of claim 16, wherein the analysis logic to simplify is further operable to: delimit a compound sentence.

18. The analysis system of claim 16, wherein the analysis logic to simplify is further operable to: process a conditional statement.

* * * * *